United States Patent
Iwai et al.

(10) Patent No.: US 10,965,422 B2
(45) Date of Patent: Mar. 30, 2021

(54) TERMINAL AND COMMUNICATION METHOD

(71) Applicant: Panasonic Intellectual Property Corporation of America, Torrance, CA (US)

(72) Inventors: Takashi Iwai, Ishikawa (JP); Hidetoshi Suzuki, Kanagawa (JP); Tomohumi Takata, Ishikawa (JP); Ayako Horiuchi, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 16/476,060

(22) PCT Filed: Jan. 17, 2018

(86) PCT No.: PCT/JP2018/001096
§ 371 (c)(1),
(2) Date: Jul. 3, 2019

(87) PCT Pub. No.: WO2018/173438
PCT Pub. Date: Sep. 27, 2018

(65) Prior Publication Data
US 2019/0356447 A1  Nov. 21, 2019

(30) Foreign Application Priority Data
Mar. 22, 2017 (JP) .............................. JP2017-056569

(51) Int. Cl.
*H04L 5/00* (2006.01)
*H04W 72/04* (2009.01)
*H04W 52/22* (2009.01)

(52) U.S. Cl.
CPC .......... *H04L 5/0051* (2013.01); *H04L 5/0039* (2013.01); *H04W 52/22* (2013.01); *H04W 72/048* (2013.01)

(58) Field of Classification Search
CPC . H04W 52/22; H04W 52/228; H04W 52/265; H04W 52/367; H04L 5/0039; H04L 5/0051
See application file for complete search history.

(56) References Cited

U.S. PATENT DOCUMENTS

2010/0246561 A1\* 9/2010 Shin ...................... H04W 52/32
370/345
2013/0215811 A1 8/2013 Takaoka et al.
(Continued)

FOREIGN PATENT DOCUMENTS

JP 2016-129407 7/2016

OTHER PUBLICATIONS

Intel Corporation; "Further discussion on SRS for NR"; 3GPP TSG RAN WG1 NR Ad-Hoc meeting Spokane, USA, Jan. 16-20, 2017; R1-1700356 (Year: 2017).\*
(Continued)

*Primary Examiner* — Gary Mui
(74) *Attorney, Agent, or Firm* — Seed IP Law Group LLP

(57) ABSTRACT

In a terminal, an SRS drop control unit drops a portion of partial bands from among a plurality of partial bands in a case where transmission power for reference signals generated using a plurality of sequences having a sequence length that corresponds to a partial band exceeds a threshold value. Furthermore, a radio transmission unit transmits the reference signals by means of the remaining partial bands other than the portion of partial bands that are dropped from among the plurality of partial bands.

16 Claims, 21 Drawing Sheets

(56) References Cited

U.S. PATENT DOCUMENTS

| | | | |
|---|---|---|---|
| 2013/0272257 A1* | 10/2013 | Takaoka | H04B 7/0447 |
| | | | 370/329 |
| 2017/0142668 A1* | 5/2017 | Takeda | H04W 72/0446 |
| 2017/0164296 A1* | 6/2017 | Nogami | H04W 16/32 |
| 2017/0324528 A1* | 11/2017 | Rico Alvarino | H04L 5/0048 |
| 2018/0026773 A1* | 1/2018 | Kim | H04L 25/0202 |
| | | | 370/278 |
| 2018/0124755 A1* | 5/2018 | Huang | H04W 72/0413 |
| 2019/0372734 A1* | 12/2019 | Choi | H04L 25/0224 |
| 2020/0067670 A1* | 2/2020 | Iwai | H04J 13/0066 |
| 2020/0083997 A1* | 3/2020 | Takata | H04W 72/042 |
| 2020/0092072 A1* | 3/2020 | Yamamoto | H04L 5/0092 |

OTHER PUBLICATIONS

International Search Report of PCT application No. PCT/JP2018/001096 dated Apr. 17, 2018.
3GPP TSG RAN WG1 Meeting #88, R1-1703453, "Discussion on SRS transmission for NR", Feb. 2017.
3GPP TSG RAN WG1 Meeting #88, R1-1702618, "Discussion on SRS Design", Feb. 2017.

\* cited by examiner

100

TERMINAL AND COMMUNICATION METHOD

TECHNICAL FIELD

The present disclosure relates to a terminal and a communication method.

BACKGROUND ART

In the standardization of 5G, new radio access technology (NR: new RAT) that does not always have backward compatibility with LTE/LTE-Advanced is being discussed by the 3GPP.

In LTE, a terminal (sometimes also referred to as a "UE" (user equipment)) transmits a reference signal referred to as sounding reference signal (hereinafter referred to as "SRS") by means of a radio resource allocated from a base station (sometimes also referred to as an "eNB" or a "gNB"). The base station estimates uplink quality in a transmission band for the SRS by measuring the reception quality of the SRS. The base station carries out frequency scheduling for the terminal or link adaptation (adaptive modulation and coding) using an estimated value for the uplink quality.

Furthermore, SRSs in LTE are generated using one Zadoff-Chu (ZC) sequence per component carrier (CC: a predetermined system band). The sequence length of the ZC sequence is decided according to the SRS transmission bandwidth. Furthermore, SRSs in LTE are transmitted in contiguous bands in order to suppress an increase in the CM/PAPR (cubic metric/peak to average power ratio). SRSs in LTE are generated using one ZC sequence and therefore have a benefit in that the CM/PAPR can be reduced.

Meanwhile, in NR, consideration is being given to multiple partial band-based SRSs (hereinafter referred to as "multi-PB SRSs") in which SRSs are transmitted at the same time by means of a plurality of partial bands (for example, see NPL 1). Multi-PB SRSs are generated using one or more sequences (for example, ZC sequences) having a sequence length that corresponds to the size of one partial band. That is, the sequence length of a multi-PB SRS is decided according to a bandwidth that corresponds to a partial band not the entire transmission bandwidth, and an SRS having a transmission bandwidth that is wider than one partial band is generated using a plurality of sequences (namely, a plurality of partial bands).

CITATION LIST

Non Patent Literature

NPL 1: R1-1703453, Panasonic, "Discussion on SRS transmission for NR", RAN1 #88, February 2017

SUMMARY OF INVENTION

With multi-PB SRSs that use a plurality of sequences, the CM/PAPR increases compared to SRSs in LTE, that is, SRSs generated from one sequence (hereinafter referred to as a "single-PB SRSs"). In a terminal, a power amplifier for a transmitter is operated in a linear region, and it is therefore necessary to reduce the maximum transmission power in accordance with the CM/PAPR. Thus, the maximum transmission power at which transmission is possible for the terminal decreases as the CM/PAPR of SRSs increases. In a case where the terminal is not able to transmit SRSs by means of the transmission power requested (instructed) from the base station when multi-PB SRSs are used, the uplink quality cannot be precisely estimated using the multi-PB SRSs at the base station.

An embodiment of the present disclosure facilitates providing a base station, a terminal, and a communication method with which it is possible to precisely estimate uplink quality even in a case where a multi-PB SRS is used.

A terminal according to an embodiment of the present disclosure is provided with: a circuit that drops a portion of partial bands from among a plurality of partial bands in a case where transmission power for reference signals generated using a plurality of sequences having a sequence length that corresponds to a partial band exceeds a threshold value; and a transmitter that transmits the reference signals by means of remaining partial bands other than the portion of partial bands that are dropped from among the plurality of partial bands.

A communication method according to an embodiment of the present disclosure includes: dropping a portion of partial bands from among a plurality of partial bands in a case where transmission power for reference signals generated using a plurality of sequences having a sequence length that corresponds to a partial band exceeds a threshold value; and transmitting the reference signals by means of remaining partial bands other than the portion of partial bands that are dropped from among the plurality of partial bands.

It should be noted that general or specific embodiments hereof may be realized by a system, a device, a method, an integrated circuit, a computer program, or a recording medium, and may be realized by an arbitrary combination of a system, a device, a method, an integrated circuit, a computer program, and a recording medium.

According to an embodiment of the present disclosure, it is possible to precisely estimate uplink quality even in a case where multi-PB SRSs are used.

Additional benefits and advantages in an embodiment of the present disclosure will be made apparent from the specification and figures. The benefits and/or advantages may each be provided by several of the embodiments and the features disclosed in the specification and figures, and need not all be provided in order to obtain one or more of the same features.

DESCRIPTION OF EMBODIMENTS

Hereinafter, embodiments of the present disclosure will be described in detail with reference to the drawings.

Figure 1:
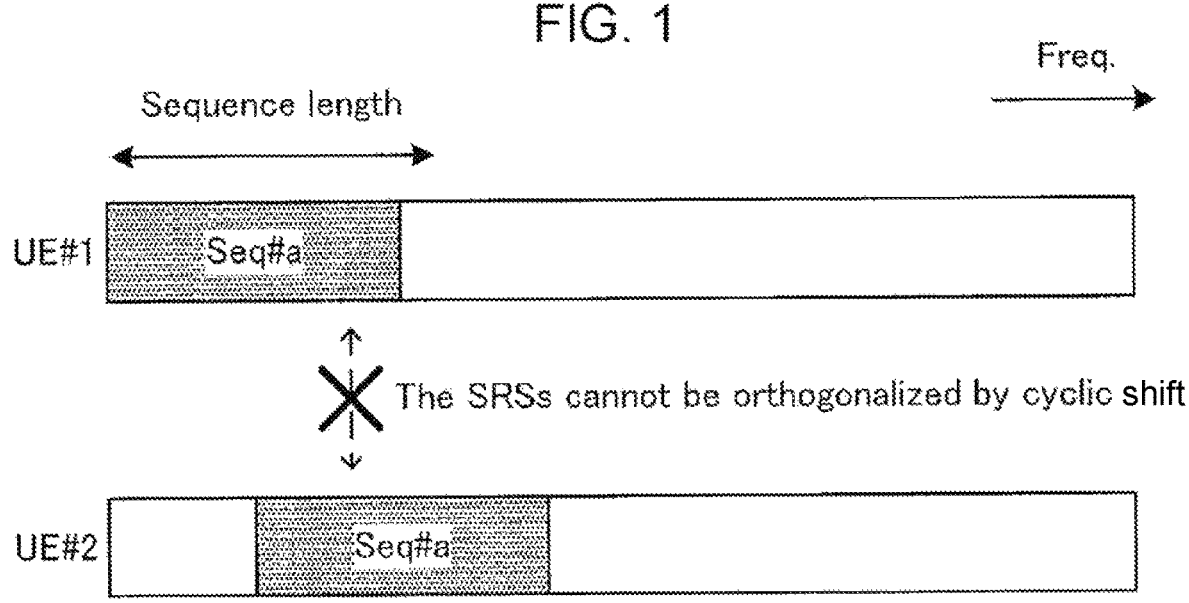
FIG. 1 depicts an example of single-PB SRSs.

An SRS in LTE (single-PB SRS) has a benefit in that the CM/PAPR can be reduced but has a drawback in that the degree of freedom for frequency scheduling is low. For example, as depicted in FIG. 1, in a case where the transmission bands of SRSs (sequence number #a) of a plurality of terminals (UE #1 and #2) do not coincide, the SRSs of the plurality of terminals cannot be code-orthogonalized by cyclic shift (CS). If the orthogonality of the SRSs breaks down, the base station is not able to correctly measure uplink quality using those SRSs. Thus, SRSs in LTE have a restriction in that transmission bands are made to completely coincide (transmission bandwidths and transmission band positions are made to coincide) between a plurality of terminals, and the degree of freedom for frequency scheduling decreases.

Meanwhile, in NR, it is necessary to support terminals having various functions/capabilities. The optimum SRS transmission bandwidth for each terminal is decided depending on the transmission bandwidth, transmission power, antenna configuration, and the like supported by each terminal. Therefore, in NR, it is important to support various SRS transmission bandwidths. Thus, in NR, a degree of freedom for frequency scheduling for SRSs is required to a greater degree than in LTE.

Figure 2:
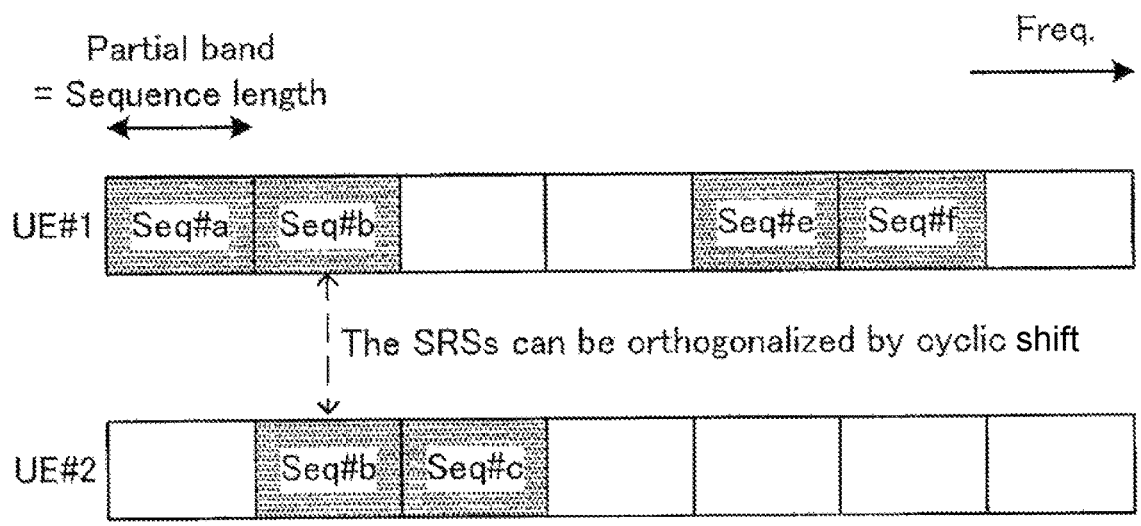
FIG. 2 depicts an example of multi-PB SRSs.

A multi-PB SRS in NR is generated using one or more sequences (for example, ZC sequences) having a sequence length that corresponds to the size of one partial band, as depicted in FIG. 2. Here, a partial band is the minimum transmission frequency unit for an SRS, which is common between a plurality of terminals. It should be noted that a partial band is sometimes referred to as a "sub-band" or a "minimum partial band".

Furthermore, as depicted in FIG. 2, consideration is also being given to transmitting multi-PB SRSs in non-contiguous bands so that the base station is able to estimate the uplink quality of a wide band in a short time.

Here, with multi-PB SRSs, the SRSs of a plurality of terminals for which the transmission bands do not coincide can be code-orthogonalized in partial band units by using different CSs. Thus, each terminal generates multi-PB SRSs using partial bands that are common between the plurality of terminals, and a base station is thereby able to freely set the SRS transmission bandwidths or transmission band positions of each terminal. In this way, multi-PB SRSs have a benefit in that the degree of freedom for frequency scheduling is high compared to SRSs in LTE.

Figure 3:
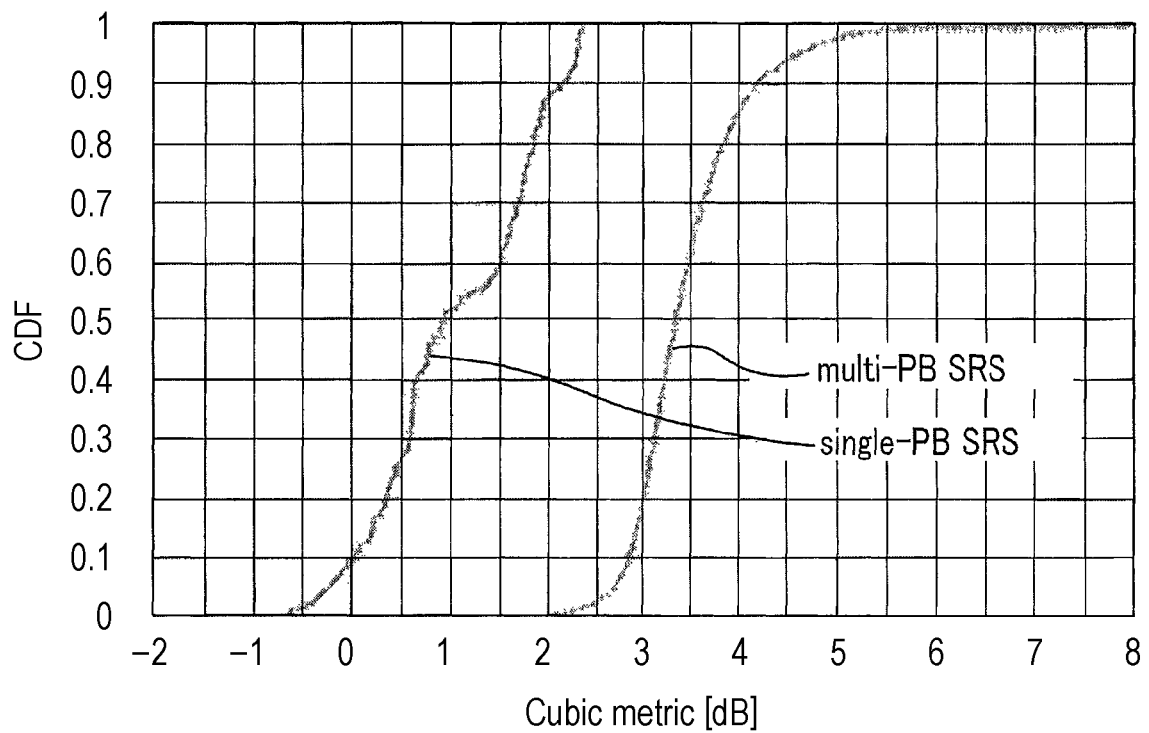
FIG. 3 depicts an example of the CM characteristics of a single-PB SRS and a multi-PB SRS.

However, as mentioned above, with multi-PB SRSs, the CM/PAPR increases compared to SRSs in LTE (single-PB SRSs). FIG. 3 depicts an example of the CM characteristics of a multi-PB SRS and a single-PB SRS. As depicted in FIG. 3, the CM of a multi-PB SRS is approximately 2 to 3 dB higher than the CM of a single-PB SRS.

In a terminal, a power amplifier for a transmitter is operated in a linear region, and it is therefore necessary to reduce the maximum transmission power in accordance with the CM/PAPR. Thus, the maximum transmission power at which transmission is possible for the terminal decreases as the CM/PAPR of SRSs increases. Therefore, in a case where multi-PB SRSs are used, there is a possibility of there being a terminal that is not able to transmit at the transmission power requested (instructed) from the base station (hereinafter referred to as a "power-limited terminal").

Furthermore, the amount of reduction in the maximum transmission power that corresponds to the CM/PAPR of a terminal is dependent on the implementation of the transmitter in the terminal. Therefore, the base station is not able to determine the actual maximum transmission power (the maximum transmission power at which transmission is possible) of a power-limited terminal. Thus, there is a possibility of the base station not being able to precisely estimate uplink quality using multi-PB SRSs transmitted by a power-limited terminal.

Thus, hereinafter, a description will be given regarding a method with which a base station precisely estimates uplink quality using multi-PB SRSs transmitted by a power-limited terminal.

Embodiment 1

Overview of Communication System

The communication system according to each embodiment of the present disclosure is provided with a terminal 100 and a base station 200.

The terminal 100 transmits multi-PB SRSs and the base station 200 receives the multi-PB SRSs. It should be noted that, as mentioned above, multi-PB SRSs are generated using one or more sequences having a sequence length that corresponds to the size of one partial band. That is, in a case where an SRS having a transmission bandwidth that is wider than one partial band is to be transmitted, the terminal 100 generates a multi-PB SRS using a plurality of sequences and transmits the multi-PB SRS by means of a plurality of partial bands.

Figure 4:
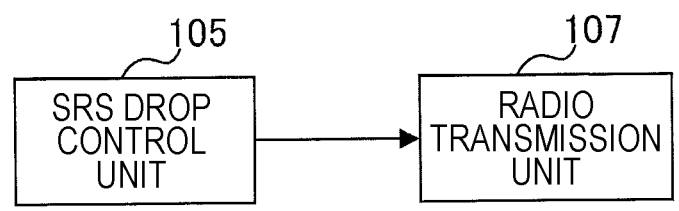
FIG. 4 depicts the configuration of part of a terminal according to embodiment 1.

FIG. 4 is a block diagram depicting the configuration of part of the terminal 100 according to an embodiment of the present disclosure. In the terminal 100 depicted in FIG. 4, an SRS drop control unit 105 drops a portion of partial bands from among a plurality of partial bands in a case where the transmission power for multi-PB SRSs generated using a plurality of sequences having a sequence length that corresponds to a partial band exceeds a threshold value (maximum transmission power). A radio transmission unit 107 transmits the multi-PB SRSs by means of the remaining partial bands other than the portion of partial bands that are dropped from among the plurality of partial bands.

Configuration of Terminal

Figure 5:
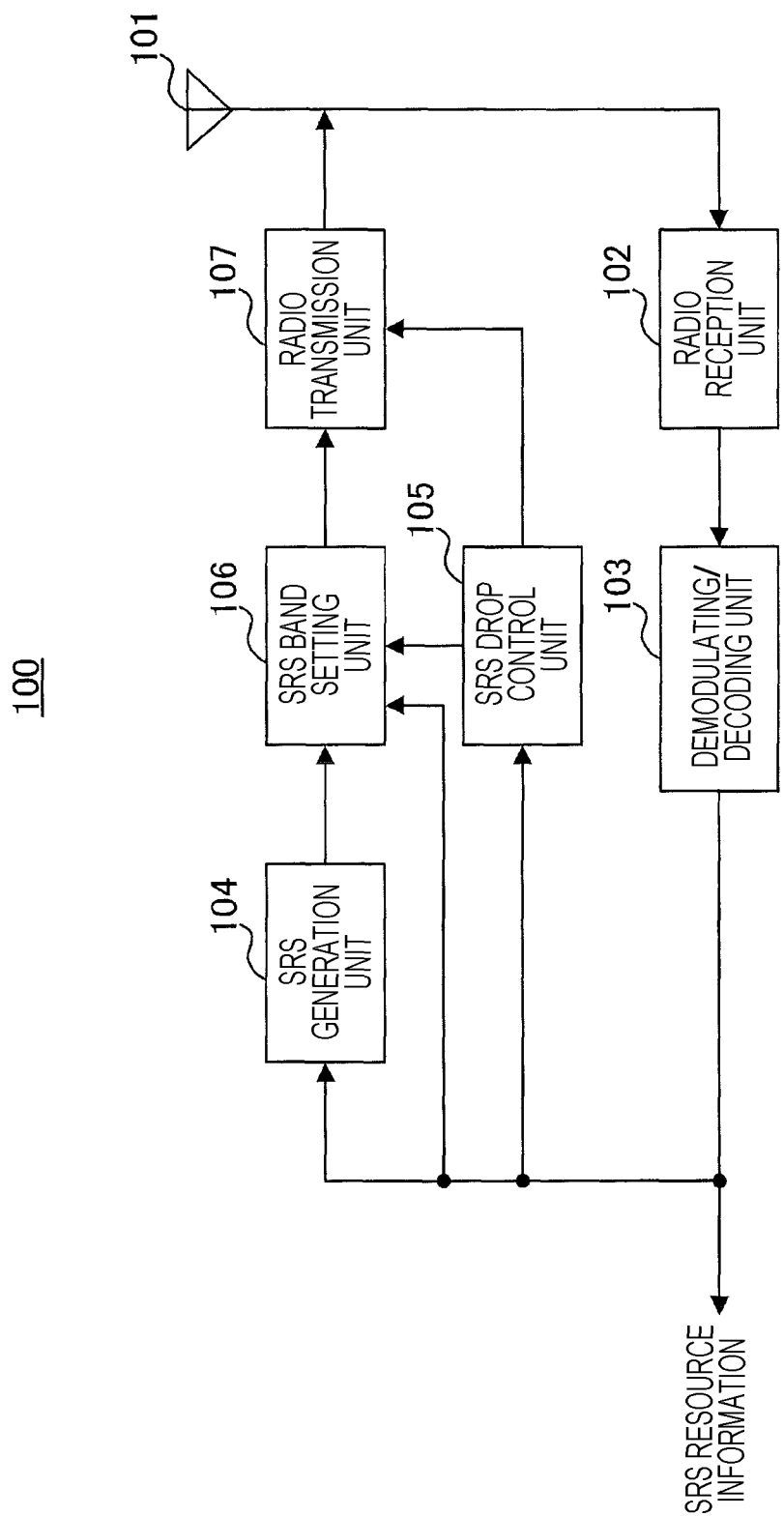
FIG. 5 depicts the configuration of the terminal according to embodiment 1.

FIG. 5 is a block diagram depicting the configuration of the terminal 100 according to the present embodiment. In FIG. 5, the terminal 100 has an antenna 101, a radio reception unit 102, a demodulating/decoding unit 103, an SRS generation unit 104, an SRS drop control unit 105, an SRS band setting unit 106, and a radio transmission unit 107.

The radio reception unit 102 carries out reception processing such as down-conversion and ND conversion on a reception signal received via the antenna 101, and outputs the reception signal to the demodulating/decoding unit 103.

The demodulating/decoding unit 103 carries out demodulation and decoding on the reception signal that is input from the radio reception unit 102, and, from the decoding result, extracts SRS resource information transmitted from the base station 200. The demodulating/decoding unit 103 outputs the SRS resource information to the SRS generation unit 104, the SRS drop control unit 105, and the SRS band setting unit 106.

The SRS resource information includes, for example, frequency resource information (for example, a partial band number within a system band), a partial band size (corresponding to the sequence length of a sequence for an SRS), sequence information of a code sequence (for example, a sequence number and a CS number), or the like with which the terminal 100 transmits SRSs. It should be noted that it is not necessary for all SRS resource information to be notified at the same time to the terminal 100. For example, some of the information of the SRS resource information may be notified in advance to the terminal 100 as cell common information or semi-static notification information. Furthermore, some of the information of the SRS resource information may be system common information specified by a specification, and may not be notified to the terminal 100.

The SRS generation unit 104 generates a code sequence (for example, a ZC sequence) having a sequence length that corresponds to the partial band size included in the SRS resource information. Furthermore, the SRS generation unit 104 assigns a cyclic shift to the generated code sequence on the basis of the CS number included in the SRS resource information. The SRS generation unit 104 outputs the code sequence obtained after the cyclic shift has been assigned, as an SRS to the SRS band setting unit 106.

In a case where the transmission power required to transmit a signal including an SRS is insufficient (in a case where the device itself is a power-limited terminal), the SRS drop control unit 105 decides a portion of partial bands (for example, partial band numbers) that are to be not transmitted (are to be dropped) from among a plurality of partial bands used to transmit multi-PB SRSs included in the SRS resource information. The SRS drop control unit 105 outputs information (partial band numbers) indicating the partial bands to be dropped, to the SRS band setting unit 106. It should be noted that the SRS drop control unit 105 may output, to the SRS band setting unit 106, frequency resource information (partial band numbers) of the remaining SRSs excluding the partial bands to be dropped.

It should be noted that a rule by which a power-limited terminal decides partial bands to be dropped (sometimes also referred to as a "drop rule" hereinafter) may be specified by the system, may be notified from the base station 200 to the terminal 100, or is shared between the terminal 100 and the base station 200.

Furthermore, the SRS drop control unit 105 calculates the transmission power for SRSs, and outputs the transmission power to the radio transmission unit 107. In a case where a portion of partial bands are to be dropped, the SRS drop control unit 105 calculates the transmission power for SRSs after the dropping (that is, after the transmission bandwidth is reduced), and outputs the transmission power to the radio transmission unit 107.

It should be noted that the details of a method for determining a power-limited terminal and a method for deciding a partial band to be dropped, in the SRS drop control unit 105, will be described later.

The SRS band setting unit 106 maps SRSs that are input from the SRS generation unit 104, from partial bands corresponding to the frequency resource information (partial band numbers) of SRSs included in the SRS resource information, to the remaining partial bands excluding the partial bands to be dropped indicated in the information that is input from the SRS drop control unit 105, and outputs mapped signals to the radio transmission unit 107.

The radio transmission unit 107 carries out D/A conversion and up-conversion on the signals that are input from the SRS band setting unit 106. Furthermore, the radio transmission unit 107 carries out amplification processing so as to reach the SRS transmission power that is input from the SRS drop control unit 105. The radio transmission unit 107 transmits a radio signal obtained by radio transmission processing, from the antenna 101 to the base station 200.

Configuration of Base Station

Figure 6:
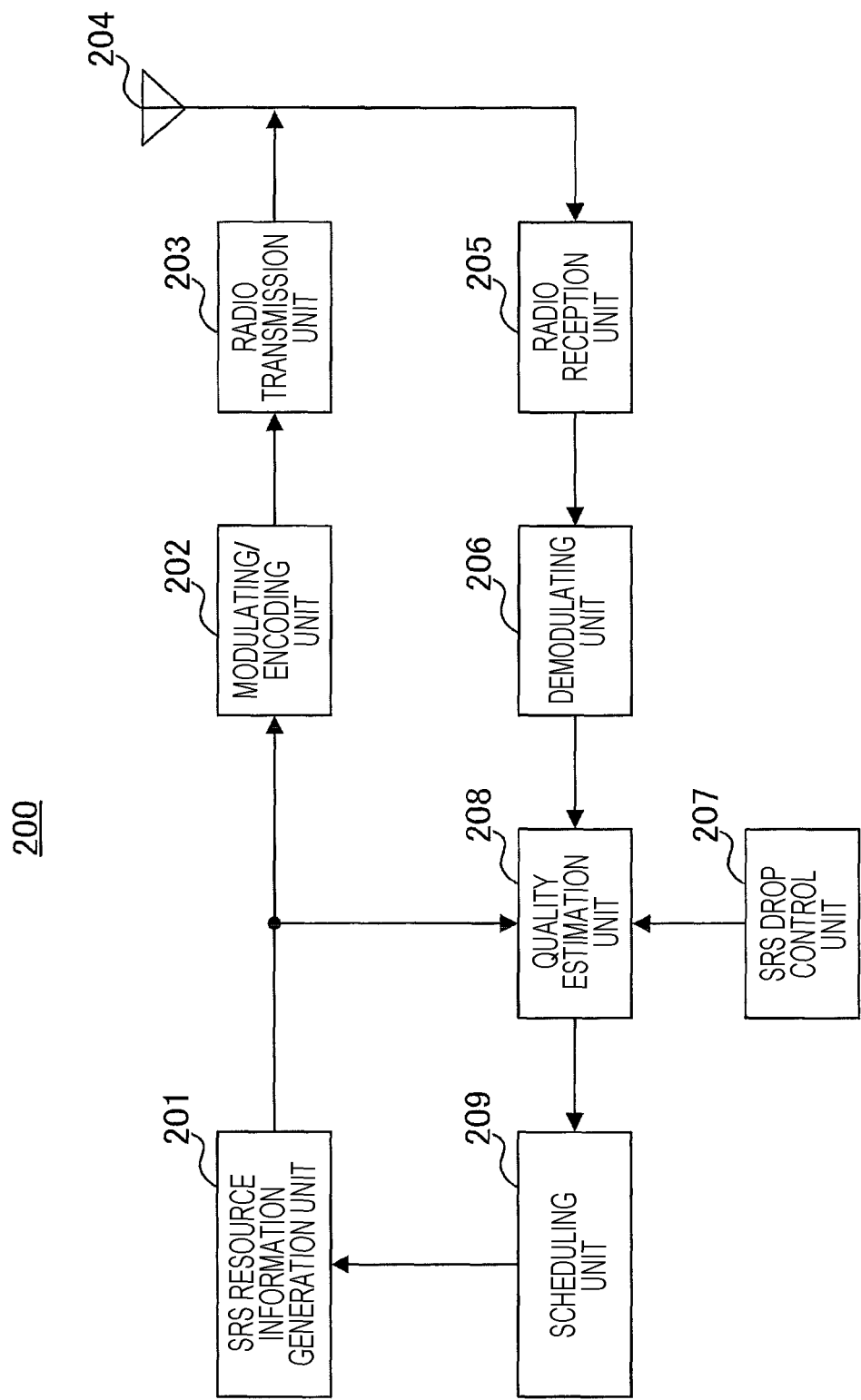
FIG. 6 depicts the configuration of a base station according to embodiment 1.

FIG. 6 is a block diagram depicting the configuration of the base station 200 according to the present embodiment. In FIG. 6, the base station 200 has an SRS resource information generation unit 201, a modulating/encoding unit 202, a radio transmission unit 203, an antenna 204, a radio reception unit 205, a demodulating unit 206, an SRS drop control unit 207, a quality estimation unit 208, and a scheduling unit 209.

The SRS resource information generation unit 201 generates a control signal for notifying the SRS resource information (the aforementioned SRS resource information received by the terminal 100) to the terminal 100, on the basis of an instruction from the scheduling unit 209 described later, and outputs the control signal to the modulating/encoding unit 202 and the quality estimation unit 208.

It should be noted that, as previously mentioned, it is not necessary for the base station 200 to notify all SRS resource information at the same time to the terminal 100. Some of the information that is common between a plurality of terminals 100 such as the partial band size may be notified to a plurality of terminals 100 accommodated by the base station 200 as cell-specific information. Furthermore, the SRS resource information may notify any information from among DCI (downlink control information), MAC (medium access control), and RRC (radio resource control), or a combination of a plurality thereof.

The modulating/encoding unit 202 modulates and encodes the control signal that is input from the SRS resource information generation unit 201, and outputs an encoded signal to the radio transmission unit 203.

The radio transmission unit 203 carries out transmission processing such as D/A conversion, up-conversion, and amplification on the signal that is input from the modulating/encoding unit 202, and transmits a radio signal obtained by means of the transmission processing from the antenna 204 to the terminal 100.

The radio reception unit 205 carries out reception processing such as down-conversion and ND conversion on a signal from the terminal 100 received via the antenna 204, and outputs a reception signal to the demodulating unit 206.

The demodulating unit 206 demodulates the reception signal that is input from the radio reception unit 205, and outputs a demodulation signal to the quality estimation unit 208.

The SRS drop control unit 207 decides partial band numbers having a possibility of being dropped by a power-limited terminal, and outputs the partial band numbers to the quality estimation unit 208. It should be noted that a rule by which a power-limited terminal decides partial bands to be dropped (drop rule) may be specified by the system, may be notified from the base station 200 to the terminal 100, or is shared between the terminal 100 and the base station 200.

The quality estimation unit 208 extracts an SRS reception signal from the demodulation signal that is input from the demodulating unit 206, on the basis of the control signal that is input from the SRS resource information generation unit 201 (SRS resource information that is notified to the terminal 100).

Furthermore, the quality estimation unit 208 determines whether or not each partial band making up an SRS reception signal has been dropped (whether or not an SRS has been transmitted by means of the partial band in question), on the basis of the partial band numbers having a possibility of being dropped by a power-limited terminal, input from the SRS drop control unit 207. For example, in a case where the average reception power of the partial bands that are dropped is less than or equal to a predetermined threshold value (corresponding to a level of noise), the quality estimation unit 208 determines that the terminal 100 that has received the SRS reception signal is a power-limited terminal, and that the partial band in question has actually been dropped. Furthermore, in a case where the average reception power of the partial bands that are dropped is greater than the predetermined threshold value, the quality estimation unit 208 determines that the terminal 100 that has received the SRS reception signal is not a power-limited terminal, and that the partial band in question has not been dropped (that is, an SRS is being transmitted).

The quality estimation unit 208 calculates a quality estimation value for each partial band from a correlation calculation result from between a replica signal generated from the code sequence used in SRS generation and the received SRS signal. Here, the quality estimation unit 208 invalidates quality estimation values for partial bands determined as having been dropped. That is, the quality estimation unit 208 outputs, to the scheduling unit 209, quality estimation values for valid partial bands other than the partial bands determined as having been dropped.

The scheduling unit 209 carries out scheduling (MCS (modulation and coding scheme) setting, frequency resource allocation, transmission power control, and the like) for data on the basis of the quality estimation result that is input from the quality estimation unit 208. Furthermore, the scheduling unit 209 decides SRS resource information for each terminal 100 with consideration being given to the allocated frequency for data, and outputs the SRS resource information to the SRS resource information generation unit 201.

Operation of Terminal 100 and Base Station 200

A detailed description will be given regarding operations in the terminal 100 and the base station 200 having the above configurations.

Figure 7:
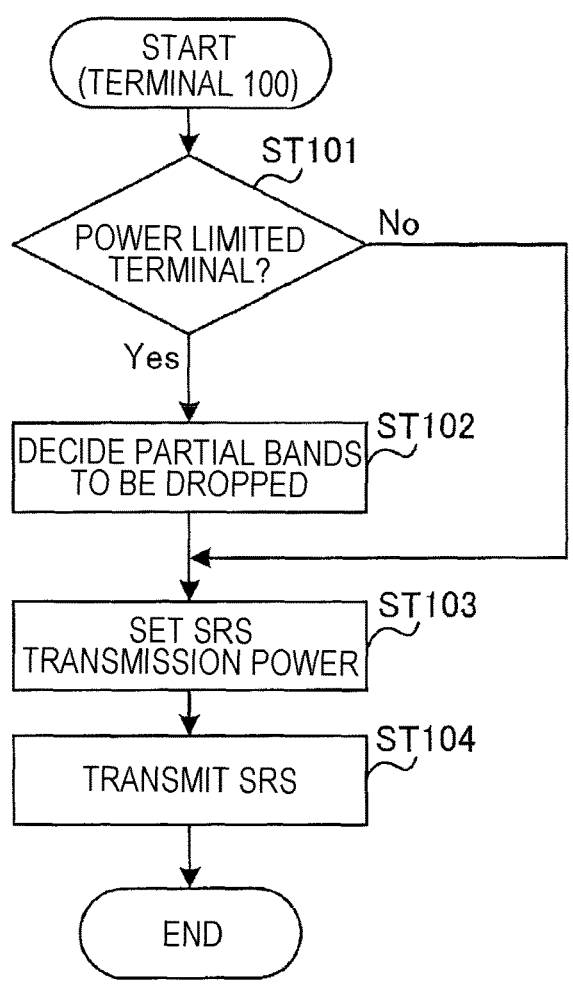
FIG. 7 depicts an example of an operation carried out by the terminal according to embodiment 1.
Figure 8:
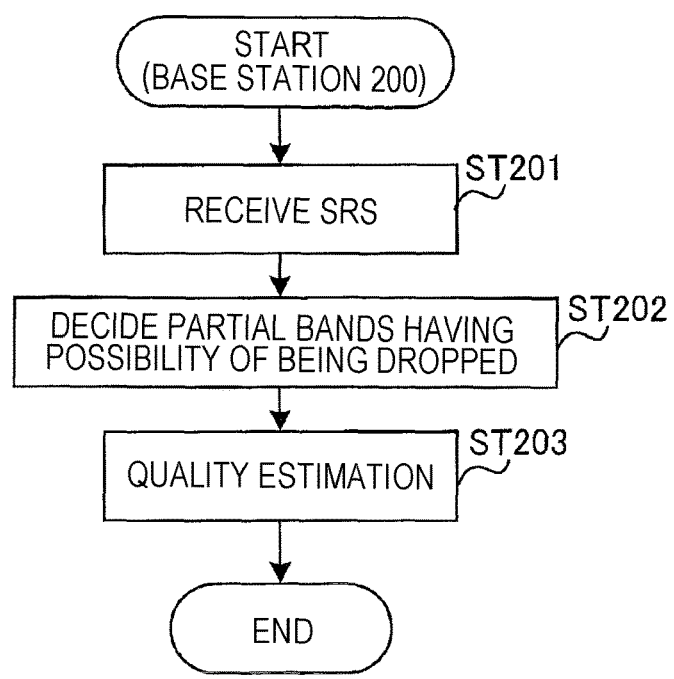
FIG. 8 depicts an example of an operation carried out by the base station according to embodiment 1.

FIG. 7 is a flowchart depicting an operation of the terminal 100 (FIG. 5), and FIG. 8 is a flowchart depicting an operation of the base station 200 (FIG. 6).

The terminal 100, when transmitting an SRS, determines whether or not the device itself is a power-limited terminal (ST101). In a case where the terminal 100 is a power-limited terminal (ST101: yes), the terminal 100 decides a portion of partial bands to be dropped (or partial bands to transmit SRSs) from among the plurality of partial bands indicated in the SRS resource information (ST102).

In this way, the terminal 100 (SRS drop control unit 105) drops a portion of partial bands from among the plurality of partial bands in a case where the transmission power for SRSs exceeds a threshold value (maximum transmission power).

The terminal 100 then sets the transmission power for SRSs (ST103). At such time, in a case where the terminal 100 is a power-limited terminal (ST101: yes), the terminal 100 sets the transmission power for SRSs that are transmitted by means of the remaining partial bands excluding the partial bands to be dropped decided in ST102. However, in a case where the terminal 100 is not a power-limited terminal (ST101: no), the terminal 100 sets the transmission power for SRSs transmitted by means of the partial bands indicated in the SRS resource information.

The terminal 100 then transmits SRSs by means of the transmission power that has been set in ST103 (ST104). In this way, in a case where a portion of partial bands are dropped, the terminal 100 (radio transmission unit 107) transmits multi-PB SRSs by means of the remaining partial bands other than the portion of partial bands that are dropped, from among the plurality of partial bands that have been set for the multi-PB SRSs.

Meanwhile, the base station 200 receives the SRSs transmitted from the terminal 100 (ST201). Furthermore, the base station 200 decides partial bands having a possibility of being dropped in the terminal 100 (partial bands having a possibility of an SRS not being transmitted therein), from among the plurality of partial bands indicated in the SRS resource information (ST202). The base station 200 then estimates uplink quality using the received SRSs (ST203). At such time, the base station 200 determines whether or not the partial bands decided in ST202 have actually been dropped. The base station 200 then invalidates quality estimation values for the partial bands that have been dropped, and validates quality estimation values for the remaining partial bands other than the partial bands that have been dropped.

Method for Determining Power-Limited Terminal

Next, a detailed description will be given regarding a method (the processing in ST101 in FIG. 7) for determining whether or not the terminal 100 is a power-limited terminal, in the terminal 100 (SRS drop control unit 105).

In a case where the terminal 100 is to transmit SRSs to one base station 200 (referred to as connection cell c), the transmission power ($P_{req,c}$) required for a transmission signal per connection cell c is equal to the transmission power ($P_{req\_SRS,c}$) required for an SRS, as indicated below.

$$P_{req,c} = P_{req\_SRS,c} \qquad \text{Expression (1)}$$

$P_{req\_SRS,c}$ in expression (1) is a value calculated from a parameter notified from the base station 200 (connection cell c) and the SRS bandwidth, and is calculated by means of expression (2) given hereinafter, for example.

$$P_{req\_SRS,c} = P_{offset,c} + 10 \log_{10} M_c + P_{o,c} + \alpha_c PL_C + f_c \quad \text{Expression (2)}$$

Here, $M_c$ is the transmission bandwidth (number of allocated RBs (resource blocks)) for an SRS, $P_{o,c}$ is a parameter value [dBm] indicating a transmission power target for a data channel, $P_{offset,c}$ is an offset value [dBm] for $P_{o,c}$, $PL_C$ is a path loss level [dB], $\alpha_c$ is a weighting coefficient indicating a compensation ratio for path loss, and $f_c$ is a transmission power control value subjected to closed-loop control (for example, a relative value such as +3 dB or −1 dB) and is an addition result that includes a past transmission power control value.

In expression (2), $P_{offset,c}$, $M_c$, $P_{o,c}$, $\alpha_c$, and $f_c$ are parameters that are instructed from the base station 200 to the terminal 100. Some of these parameters may be included in the SRS resource information. Furthermore, in expression (2), $PL_C$ is a parameter that is measured by the terminal 100 (not depicted).

Next, the maximum transmission power ($P_{CMAX,c}$) at which transmission is possible for the terminal 100 per base station 200 (connection cell c) is calculated as shown below, for example.

$$P_{CMAX,c} = P_{PowerClass} - MPRC \quad \text{Expression (3)}$$

Here, the $P_{PowerClass}$ is the nominal maximum transmission power of the terminal 100 (for example, 23 dBm in the case of LTE), and MPRc is amount of reduction in the maximum transmission power (maximum power reduction) corresponding to the CM/PAPR of a transmission signal.

Although the maximum permitted value for MPRc is notified from the base station 200 to the terminal 100, the actual value for MPRc is dependent on the implementation of the terminal 100. Therefore, the base station 200 is not able to determine the actual value for MPRc. That is, the base station 200 is not able to determine the maximum transmission power $P_{CMAX,c}$ of the terminal 100 that takes MPRc given in expression (3) into consideration. It should be noted that there are also cases where a maximum transmission power reduction for suppressing the out-of-band interference level is further added, depending on the transmission band position or the like, as the amount of reduction in the maximum transmission power.

Here, in the case of the condition given in expression (4), that is, in the case where the maximum transmission power ($P_{CMAX,c}$) at which transmission is possible for the terminal 100 is less than the transmission power ($P_{req,c}$) required for a transmission signal per connection cell c, the terminal 100 is no longer able to transmit a transmission signal by means of the transmission power as requested by the base station 200, and the transmission power is insufficient.

$$P_{CMAX,c} < P_{req,c} \quad \text{Expression (4)}$$

Thus, the SRS drop control unit 105 of the terminal 100 determines that a terminal 100 satisfying the condition of expression (4) is a power-limited terminal, in the transmission power calculations given in expressions (1) to (3).

It should be noted that the difference between $P_{CMAX,c}$ and $P_{req,c}$ defined by expression (5) given hereinafter is referred to as the power headroom (PHR).

$$PHR = P_{CMAX,c} - P_{req,c} \quad \text{Expression (5)}$$

Thus, the SRS drop control unit 105 of the terminal 100 may determine that a terminal 100 having a negative value for PHR given in expression (5) is a power-limited terminal, in the transmission power calculations given in expressions (1) to (3).

Furthermore, in a case where the terminal 100 transmits a transmission signal including an SRS to a plurality of cells or a plurality of CCs at the same timing (for example, the same slot or the same subframe), the SRS drop control unit 105 may determine whether or not the terminal 100 is a power-limited terminal on the basis of the transmission power ($P_{req,c}$) required in all (or some) of the plurality of cells or the plurality of CCs. Specifically, the SRS drop control unit 105 determines that the terminal 100 is a power-limited terminal in a case where the condition given below is satisfied, on the basis of the total transmission power ($\Sigma P_{req,c}$) of the transmission power ($P_{req,c}$) required by each connection cell c and the total maximum transmission power at which transmission is possible ($P_{CMAX}$) for the terminal 100.

$$P_{CMAX} < \Sigma P_{req,c} \quad \text{Expression (6)}$$

Method for Deciding Partial Bands to be Dropped

Next, a detailed description will be given regarding a method (the processing in ST102 in FIG. 7) for deciding partial bands to be dropped in a case where the terminal 100 is a power-limited terminal, in the terminal 100 (SRS drop control unit 105).

Hereinafter, a description will be given regarding specific examples 1 and 2 in which partial bands to be dropped are decided.

Specific Example 1

In specific example 1, the SRS drop control unit 105 drops non-contiguous partial bands. For example, the SRS drop control unit 105 selects non-contiguous partial bands in an equal manner from among a plurality of partial bands instructed for the transmission of SRSs, and drops the selected partial bands.

Figure 9:
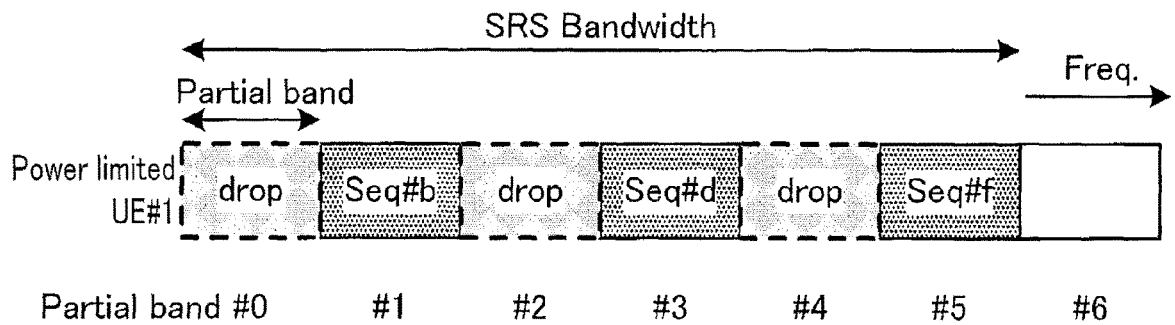
FIG. 9 depicts an example of a method for deciding partial bands to be dropped according to embodiment 1.
Figure 10:
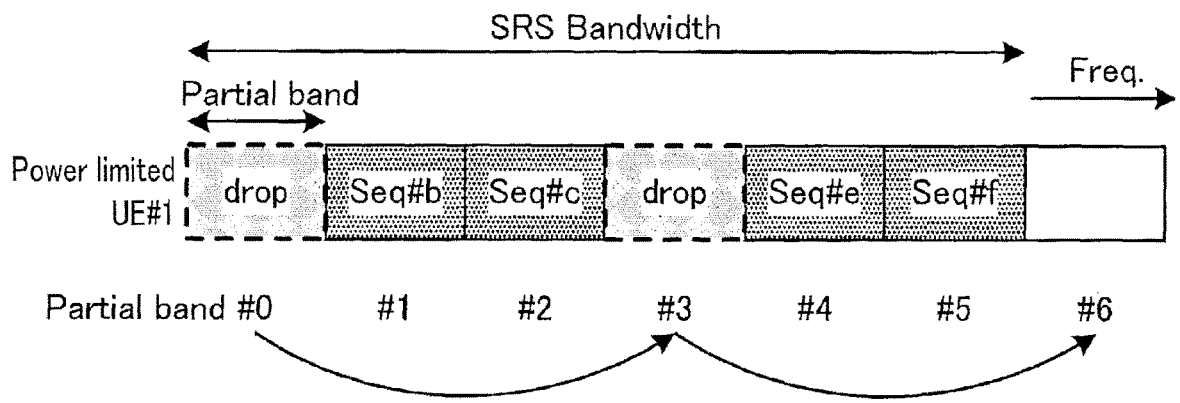
FIG. 10 depicts an example of a method for deciding partial bands to be dropped according to embodiment 1.
Figure 11:
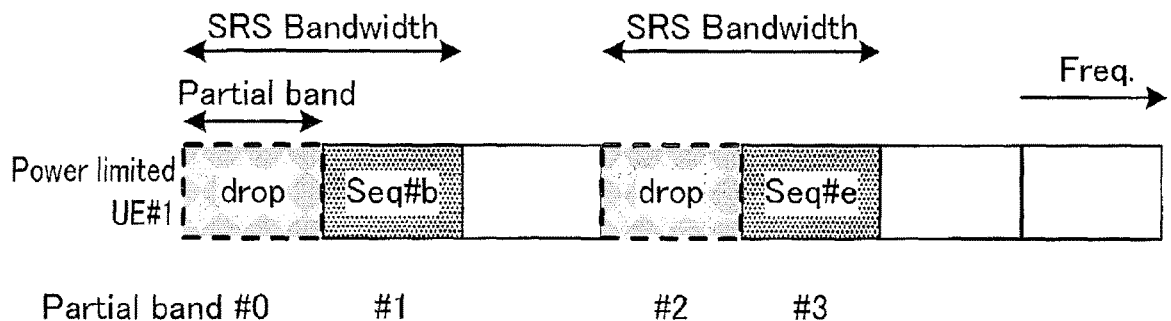
FIG. 11 depicts an example of a method for deciding partial bands to be dropped according to embodiment 1.

FIGS. 9, 10, and 11 depict examples of the partial bands that are dropped in specific example 1.

In FIGS. 9 and 10, partial band numbers (#0 to #6 in FIG. 9) are added to each partial band defined within the system band. Furthermore, in FIGS. 9 and 10, the SRS transmission band is the six partial bands having partial band numbers #0 to #5.

For example, the SRS drop control unit 105 drops even-numbered partial bands #0, #2, and #4, as depicted in FIG. 9. In other words, the terminal 100 transmits SRSs in partial bands #1, #3, and #5. FIG. 9 depicts the case where even-numbered partial bands are dropped; however, it should be noted that odd-numbered partial bands may be dropped.

Alternatively, as depicted in FIG. 10, the SRS drop control unit 105 drops a partial band at each specified fixed number (three in FIG. 10). In other words, in FIG. 10, the terminal 100 drops partial bands #0 and #3, and transmits SRSs in the remaining partial bands #1, #2, #4, and #5. It should be noted that the interval at which partial bands are dropped is not restricted to three and may be another value. Furthermore, the start position of the partial bands to be dropped is not restricted to partial band #0 (edge of the SRS transmission band), and the SRS drop control unit 105 may drop a partial band at each fixed number from a partial band at another position.

In the examples of FIGS. 9 and 10, a description has been given regarding drop rules for deciding partial bands to be dropped on the basis of physical partial band numbers defined within the system band. However, the drop rule may be based on logical partial band numbers defined within the SRS transmission band of the terminal 100. FIG. 11 depicts an example of a drop rule that is based on logical partial band numbers defined within the SRS transmission band. In FIG. 11, logical partial band numbers #0 to #3 are respectively added to four partial bands making up the SRS transmission band. In FIG. 11, the SRS drop control unit 105 drops even-numbered partial bands #0 and #2 from among the logical partial band numbers. It should be noted that the odd-numbered partial bands may be dropped in FIG. 11.

In this way, the terminal 100 (power-limited terminal) drops non-contiguous partial bands, and is thereby able to drop partial bands in a uniform manner within a plurality of partial bands (frequency domains) indicated in SRS parameter information. Thus, in the base station 200, it is possible to suppress a narrowing of the frequency band in which uplink quality can be estimated, and the frequency scheduling performance improves.

Specific Example 2

In specific example 2, the SRS drop control unit 105 drops contiguous partial bands. For example, the SRS drop control unit 105 drops a specified number of partial bands successively from the partial band having the lowest frequency (or the highest frequency) within the SRS transmission band allocated to the terminal 100.

Figure 12:
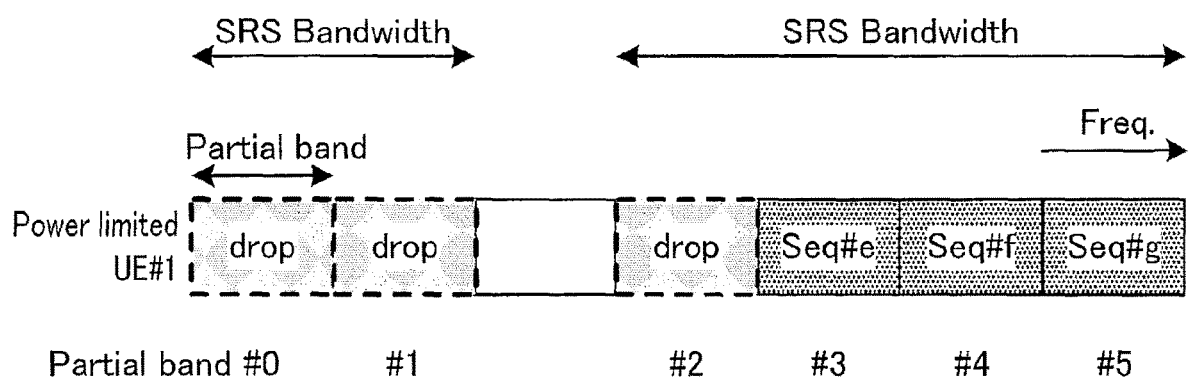
FIG. 12 depicts an example of logical partial band numbers of SRS transmission bands according to embodiment 1.

FIG. 12 depicts an example of the partial bands that are dropped in specific example 2.

In FIG. 12, as an example, logical partial band numbers #0 to #5 defined within an SRS transmission band are added from among the partial bands defined within the system band.

As depicted in FIG. 12, the SRS drop control unit 105 drops a specified number of contiguous partial bands (three in FIG. 12) successively from partial band #0 having the lowest frequency, from among partial bands #0 to #5 within the SRS transmission band.

In this way, a portion of the contiguous partial bands within the SRS transmission band are dropped, and thus the SRS transmission bandwidth ($M_c$) narrows. When the SRS transmission bandwidth ($M_c$) narrows, the transmission power ($P_{req\_SRS}$) required for an SRS decreases in accordance with expression (2), and therefore the condition of expression (4) is no longer satisfied, and there is a possibility of the terminal 100 no longer being a power-limited terminal.

Thus, in specific example 2, the aforementioned number of partial bands to be dropped may not be a fixed value, and the SRS drop control unit 105 may drop contiguous partial bands successively until the terminal 100 is no longer a power-limited terminal. It is thereby possible to suppress an increase in the number of partial bands that are dropped, and to improve uplink quality estimation precision in the base station 200.

Hereinabove, a description has been given regarding specific examples 1 and 2 in which partial bands to be dropped are decided.

As described hereinabove, in the present embodiment, the terminal 100, when having determined that the device itself is a power-limited terminal, drops (does not transmit) a portion of the partial bands in the transmission band for multi-PB SRSs, and transmits the multi-PB SRSs by means of the remaining partial bands.

Due to a portion of the partial bands within the SRS transmission band being dropped, the SRS transmission bandwidth narrows, and the transmission power (namely $P_{req\_SRS}$) required for transmission of an SRS decreases (for example, see expression (2)). Furthermore, there is a characteristic in that the CM/PAPR decreases as the number of partial bands simultaneously transmitted decreases, and therefore the MPRc decreases, and the maximum transmission power ($P_{CMAX,c}$) at which transmission is possible for the terminal 100 increases (for example, see expression (3)). In other words, due to a portion of the partial bands within the SRS transmission band being dropped, the maximum transmission power ($P_{CMAX,c}$) at which transmission is possible for the terminal 100 increases, and the transmission power ($P_{req,c}$) required for the transmission of SRSs decreases. Therefore, in the terminal 100, with respect to SRSs transmitted by means of the remaining partial bands, there is an increase in the possibility of the condition given in expression (4) no longer being satisfied, that is, the possibility of being able to transmit transmission signals by means of the transmission power as requested by the base station 200. Thus, a power-limited terminal is able to transmit SRSs by means of the transmission power as requested by the base station 200, or a power that is close to the transmission power requested by the base station 200, using the remaining partial bands that have not been dropped.

Figure 13:
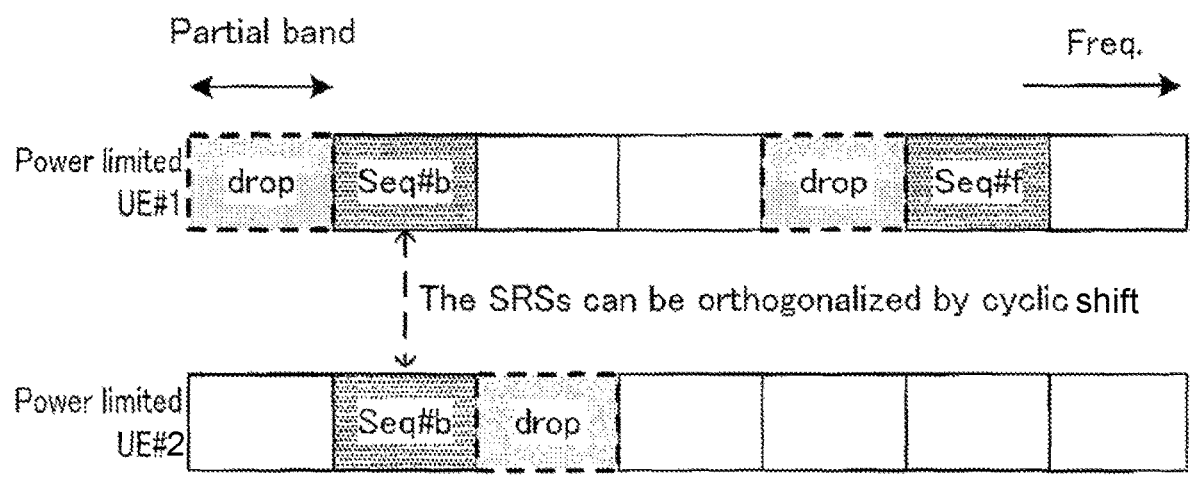
FIG. 13 describes orthogonality in partial bands according to embodiment 1.

Furthermore, multi-PB SRSs have the feature of it being possible to orthogonalize the SRSs of a plurality of terminals 100 that use different CS numbers for each partial band. Therefore, for example, even if a portion of partial bands are dropped in each terminal 100 (UE #1 and UE #2), it is possible to maintain orthogonality by means of a code sequence (for example, Seq #b) in the remaining partial bands transmitted from each terminal 100, as depicted in FIG. 13.

Thus, using multi-PB SRSs transmitted from a power-limited terminal by means of the remaining partial bands other than the portion of partial bands that have been dropped, the base station 200 is able to precisely estimate the uplink quality of the remaining partial bands.

Thus, according to the present embodiment, it is possible to precisely estimate uplink quality even in a case where multi-PB SRSs are used.

In specific example 1, a method for dropping even-numbered (or odd-numbered) partial bands and a method for dropping partial bands at each fixed number have been described as methods for dropping non-contiguous partial bands; however, it should be noted that there is no restriction thereto. For example, similar to the method described in specific example 2, the SRS drop control unit 105 may drop partial bands of a quantity at which the terminal 100 is no longer a power-limited terminal, from among the even-numbered (or odd-numbered) partial bands or the partial bands at each fixed number. It is thereby possible to suppress an increase in the number of partial bands that are dropped, and to improve uplink quality estimation precision in the base station 200.

Embodiment 2

In the present embodiment, a description will be given regarding a case where the drop rule for multi-PB SRSs is decided using terminal-specific parameter information.

Configuration of Terminal

Figure 14:
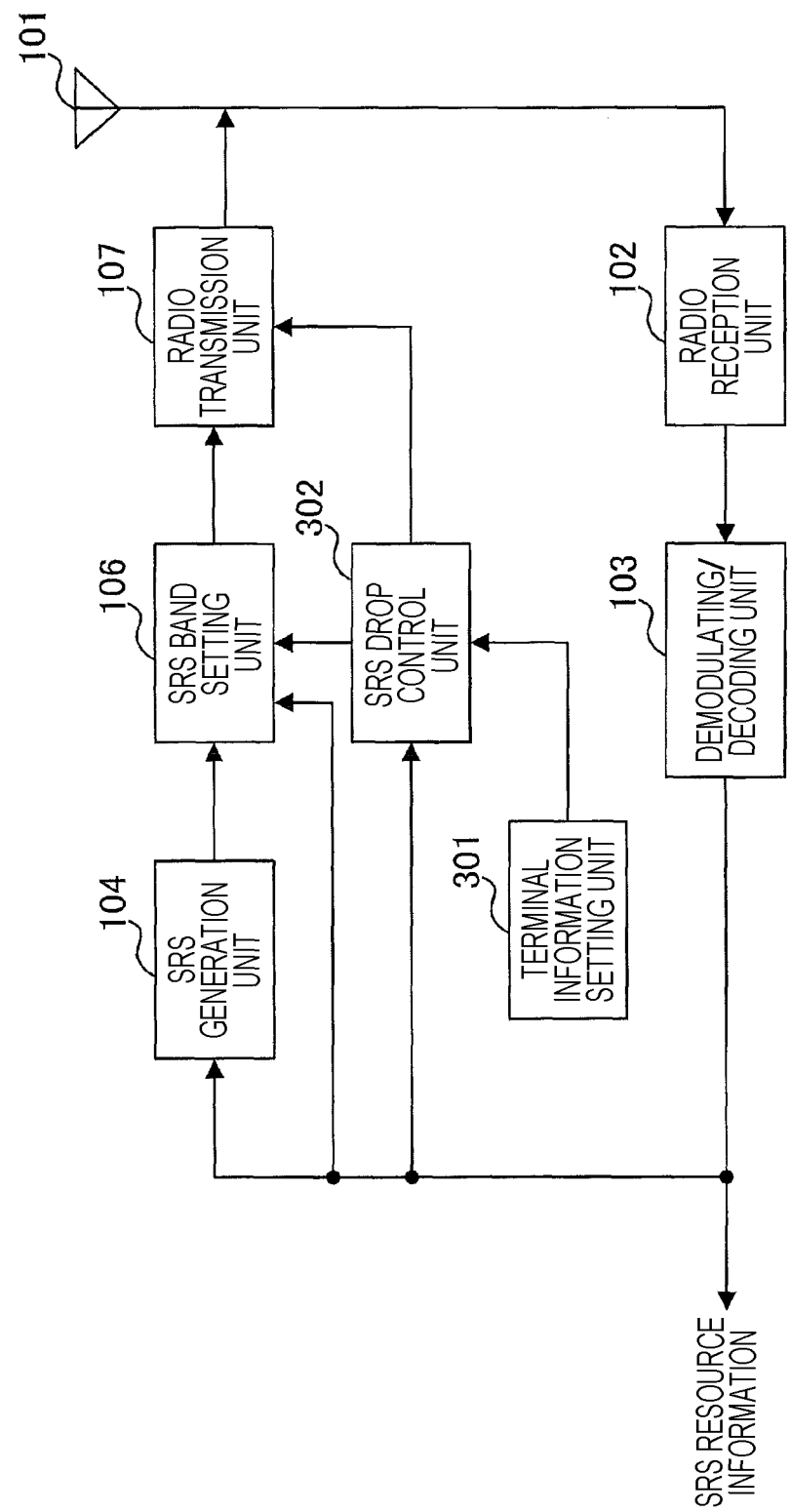
FIG. 14 depicts the configuration of a terminal according to embodiment 2.

FIG. 14 is a block diagram depicting the configuration of a terminal 300 according to the present embodiment. It should be noted that, in FIG. 14, the same configurations as in embodiment 1 (FIG. 5) are denoted by the same reference signs, and descriptions thereof have been omitted. Specifically, compared to the terminal 100 depicted in FIG. 5, a terminal information setting unit 301 has been added to the terminal 300 depicted in FIG. 14.

The terminal information setting unit 301 sets terminal-specific parameter information, and outputs the terminal-specific parameter information to an SRS drop control unit 302. Here, the terminal-specific parameter information is, for example, a terminal ID, a CS number, or the like. It should be noted that the terminal-specific parameter information is not restricted to a terminal ID or a CS number, and terminal-specific information with which each terminal 300 can be identified is sufficient.

The SRS drop control unit 302 decides the partial bands to be dropped, on the basis of terminal-specific parameter information that is input from the terminal information setting unit 301, and outputs information indicating the decided partial bands (for example, partial band numbers) to the SRS band setting unit 106.

Configuration of Base Station

Figure 15:
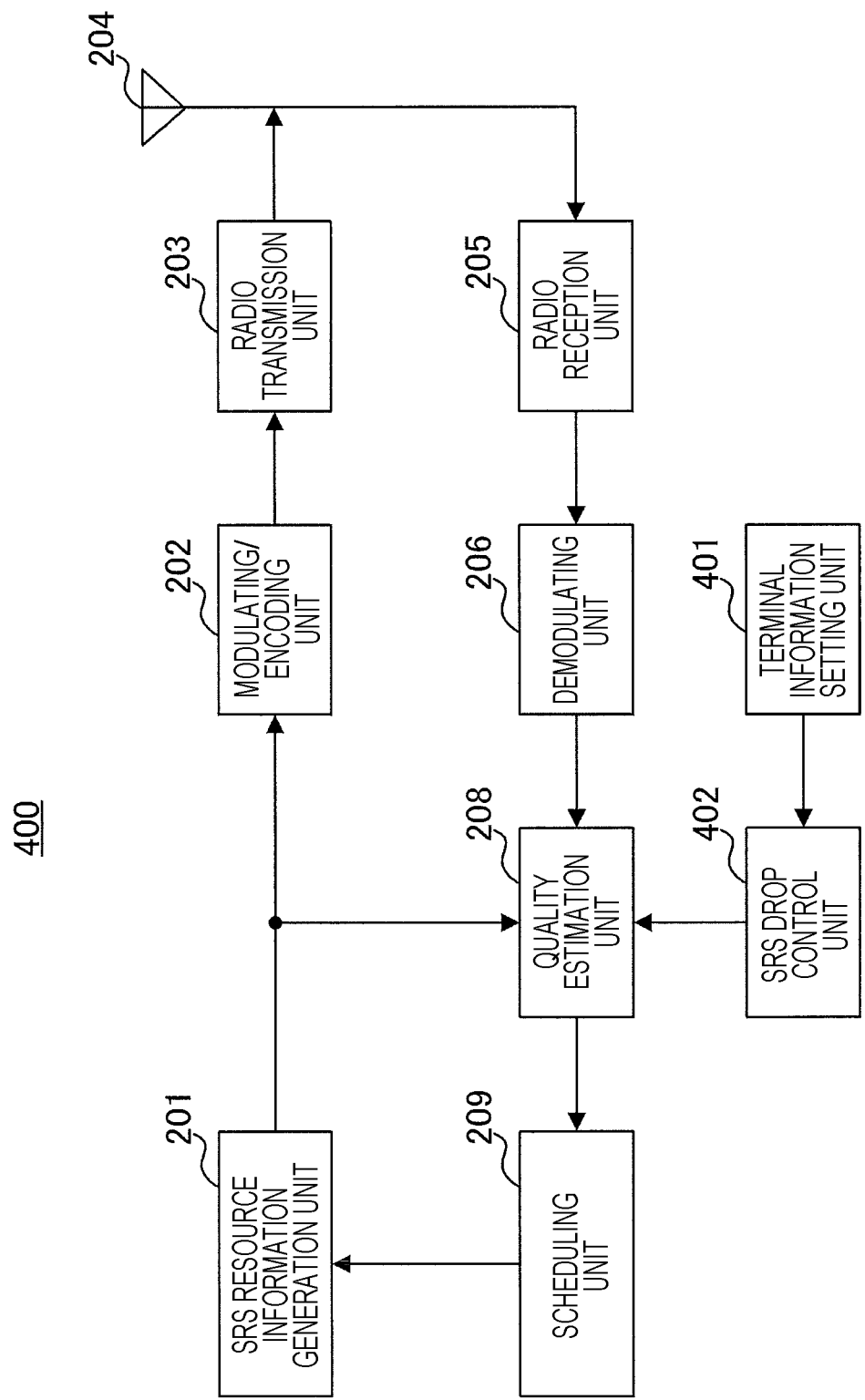
FIG. 15 depicts the configuration of a base station according to embodiment 2.

FIG. 15 is a block diagram depicting the configuration of a base station 400 according to the present embodiment. It should be noted that, in FIG. 15, the same configurations as in embodiment 1 (FIG. 6) are denoted by the same reference signs, and descriptions thereof have been omitted. Specifically, compared to the base station 200 depicted in FIG. 6, a terminal information setting unit 401 has been added to the base station 400 depicted in FIG. 15.

Similar to the terminal information setting unit 301 provided in the terminal 300, the terminal information setting unit 401 sets terminal-specific parameter information (for example, a terminal ID, a CS number, or the like) for each terminal 300, and outputs the terminal-specific parameter information to an SRS drop control unit 402.

The SRS drop control unit 402 decides partial bands (partial band numbers) having a possibility of being dropped, on the basis of the terminal-specific parameter information that is input from the terminal information setting unit 401, and outputs decided partial band numbers to the quality estimation unit 208.

Method for Deciding Partial Bands to be Dropped

Next, a detailed description will be given regarding a method (drop rule) for deciding partial bands to be dropped in a case where the terminal 300 is a power-limited terminal, in the terminal 300 (SRS drop control unit 302).

Specific Example 3

In specific example 3, the SRS drop control unit 302 decides the partial bands to be dropped, on the basis of a terminal ID (UE ID), as an example of terminal-specific parameter information.

Figure 16:
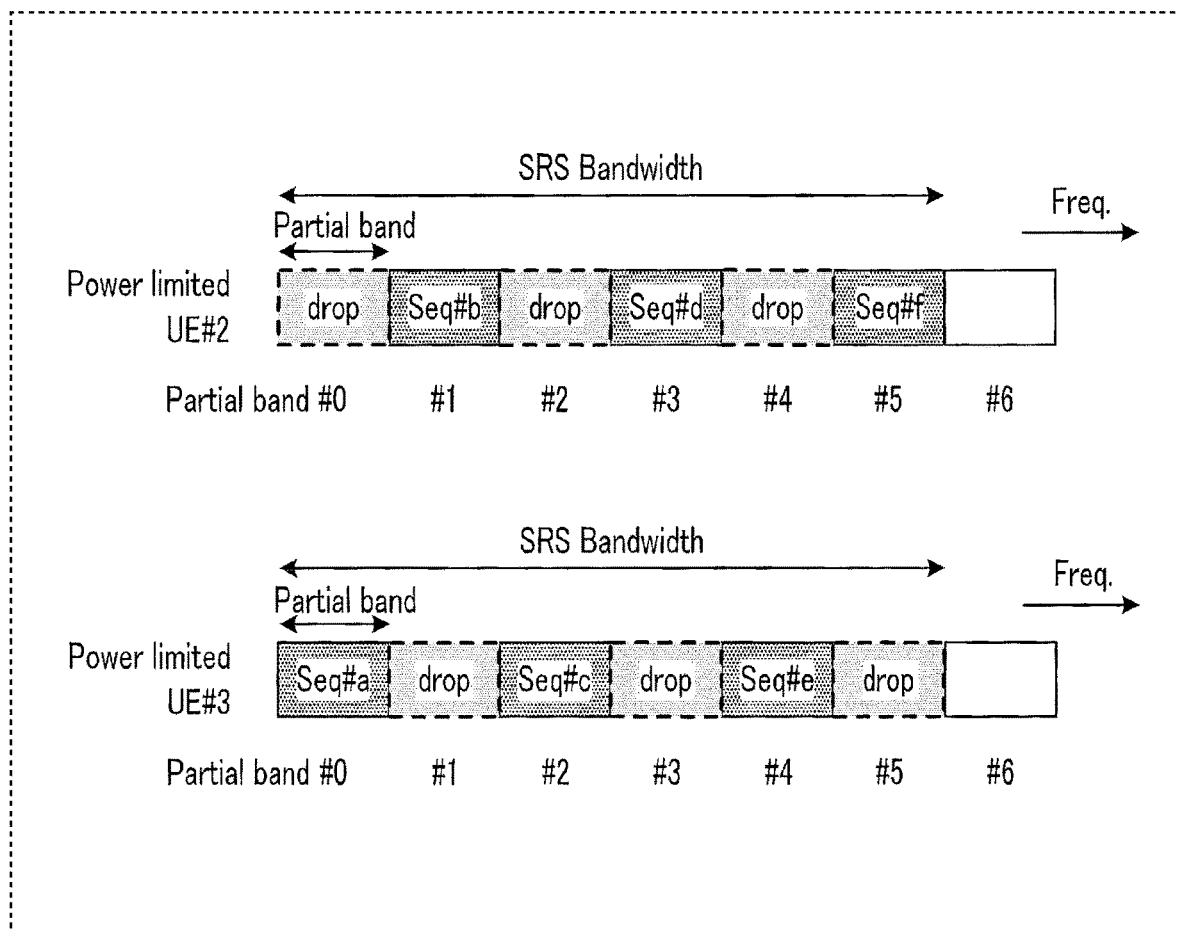
FIG. 16 depicts an example of a method for deciding partial bands to be dropped according to embodiment 2.

FIG. 16 depicts an example of the partial bands that are dropped in specific example 3. In FIG. 16, partial band numbers (#0 to #6 in FIG. 16) are added to each partial band defined within the system band. Furthermore, in FIG. 16, the SRS transmission band is the six partial bands having partial band numbers #0 to #5.

In FIG. 16, in a case where a terminal ID is an odd number (UE #3 in FIG. 16), the SRS drop control unit 302 drops odd-numbered partial bands #1, #3, and #5. In other words, the UE #3 transmits SRSs in partial bands #0, #2, and #4. Meanwhile, in FIG. 16, in a case where the terminal ID is an even number (UE #2 in FIG. 16), the SRS drop control unit 302 drops even-numbered partial bands #0, #2, and #4. In other words, the UE #2 transmits SRSs in partial bands #1, #3, and #5.

It should be noted that the SRS drop control unit 302 may drop odd-numbered partial bands in a case where the terminal ID is an even number, and may drop even-numbered partial bands in a case where the terminal ID is an odd number.

In this way, the portion of partial bands that are dropped in the terminal 300 are associated with the terminal ID (terminal-specific parameter information) of the terminal 300. Thus, as depicted in FIG. 16, the partial bands that are dropped are mutually different between the terminal 300 having an even-numbered terminal ID and the terminal 300 having an odd-numbered terminal ID. In other words, by associating partial bands that are dropped with terminal IDs, an effect can be expected with which the bands to be dropped are made random among the plurality of terminals 300.

It should be noted that the terminal-specific parameter information is not restricted to a terminal ID, and a CS number that is set to SRSs transmitted by the terminal 300 may be used. For CS numbers, numbers are set that are respectively different for the plurality of terminals 300 that multiplex SRSs. Thus, due to the portion of partial bands that are dropped being associated with CS numbers, similar to the case where terminal IDs are used, an effect can be expected with which the bands to be dropped are made random among the plurality of terminals 300 that multiplex SRSs.

Furthermore, logical partial band numbers may be used such as in FIG. 12 rather than the physical partial band numbers depicted in FIG. 16. Furthermore, the partial bands to be dropped are not restricted to non-contiguous partial bands such as those depicted in FIG. 16, and may be contiguous partial bands such as those depicted in FIG. 12, for example.

Based on the above, in the present embodiment, similar to embodiment 1, due to a portion of partial bands within the SRS transmission band being dropped, the maximum transmission power ($P_{CMAX,c}$) at which transmission is possible for the terminal 300 increases, the transmission power ($P_{req,c}$) required for the transmission of SRSs decreases, and with respect to SRSs transmitted by means of the remaining partial bands, the possibility of being able to transmit transmission signals by means of the transmission power as requested by the base station 400 increases. Thus, a power-limited terminal is able to transmit SRSs by means of the transmission power as requested by the base station 400, or a power that is close to the transmission power requested by the base station 400, using the remaining partial bands that have not been dropped. Thus, using multi-PB SRSs transmitted from a power-limited terminal by means of the remaining partial bands other than the portion of partial bands that have been dropped, the base station 400 is able to precisely estimate the uplink quality of the remaining partial bands.

Furthermore, according to the present embodiment, the drop rule for multi-PB SRSs is decided based on terminal-specific parameter information. Thus, the partial bands that are dropped by a power-limited terminal can be made random (made uniform) among the plurality of terminals 300 within a cell. Therefore, interference to other cells from SRSs can be made random. Furthermore, due to each terminal 300 transmitting SRSs by means of different partial bands on the basis of terminal-specific parameter information, in the base station 400, there is an increase in the partial bands for which uplink quality can be estimated within a cell, and there is an improvement in frequency scheduling performance.

Embodiment 3

In the present embodiment, a description will be given regarding a case where the drop rule for multi-PB SRSs is decided using time information (timing information) relating to SRSs.

Configuration of Terminal

Figure 17:
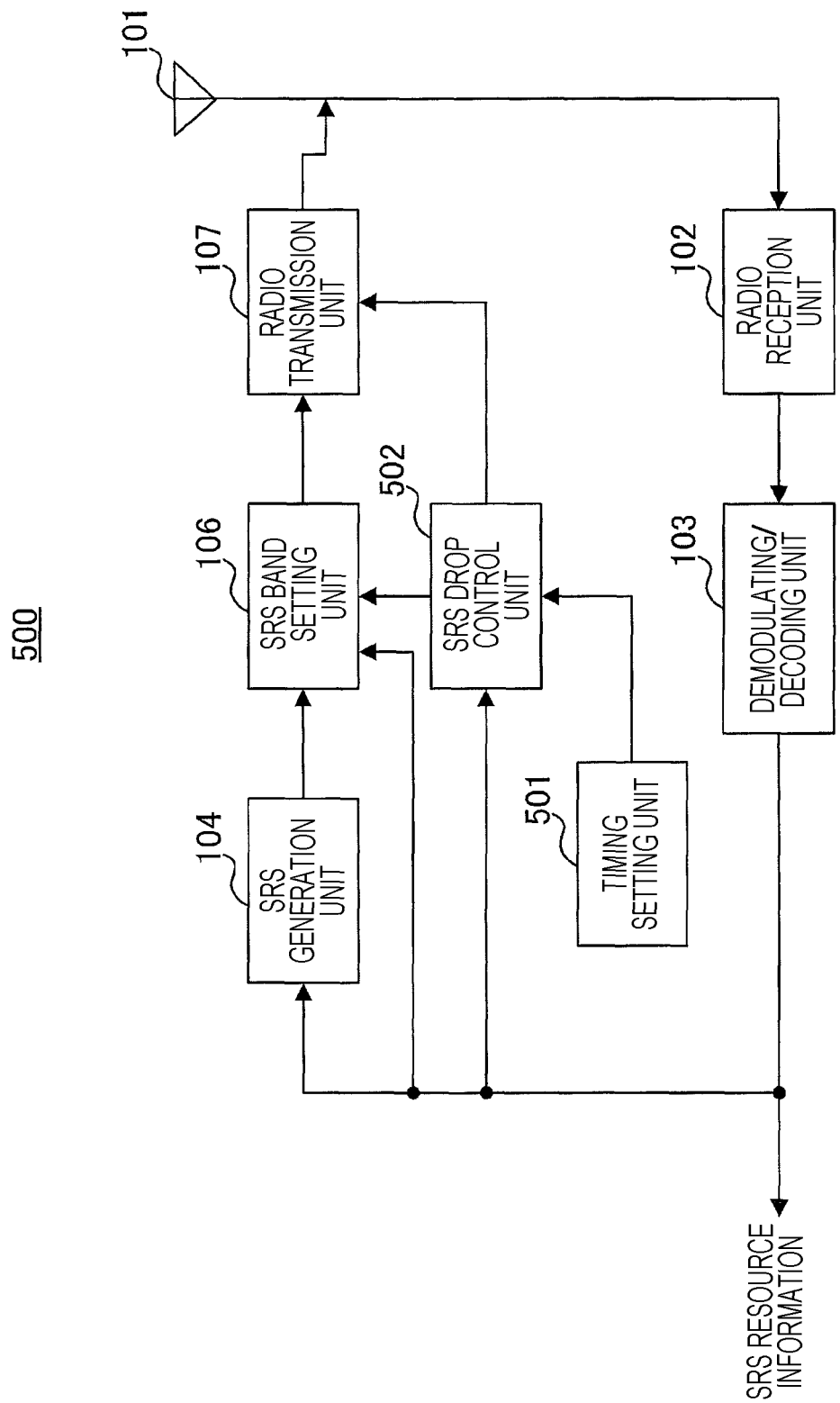
FIG. 17 depicts the configuration of a terminal according to embodiment 3.

FIG. 17 is a block diagram depicting the configuration of a terminal 500 according to the present embodiment. It should be noted that, in FIG. 17, the same configurations as in embodiment 1 (FIG. 5) are denoted by the same reference signs, and descriptions thereof have been omitted. Specifically, compared to the terminal 100 depicted in FIG. 5, a timing setting unit 501 has been added to the terminal 500 depicted in FIG. 17.

The timing setting unit 501 sets SRS transmission timing information, and outputs the transmission timing information to an SRS drop control unit 502. Here, SRS transmission timing information is, for example, a slot number (or a subframe number) in which an SRS is transmitted, an SRS transmission count number, or the like. It should be noted that the SRS transmission timing information is not restricted to a slot number (subframe number) or a transmission count, and a parameter with which it is possible to specify an SRS transmission timing of each terminal 500 is sufficient.

The SRS drop control unit 502 decides the partial bands to be dropped, on the basis of transmission timing information that is input from the timing setting unit 501, and outputs information indicating the decided partial bands (for example, partial band numbers) to the SRS band setting unit 106.

Configuration of Base Station

Figure 18:
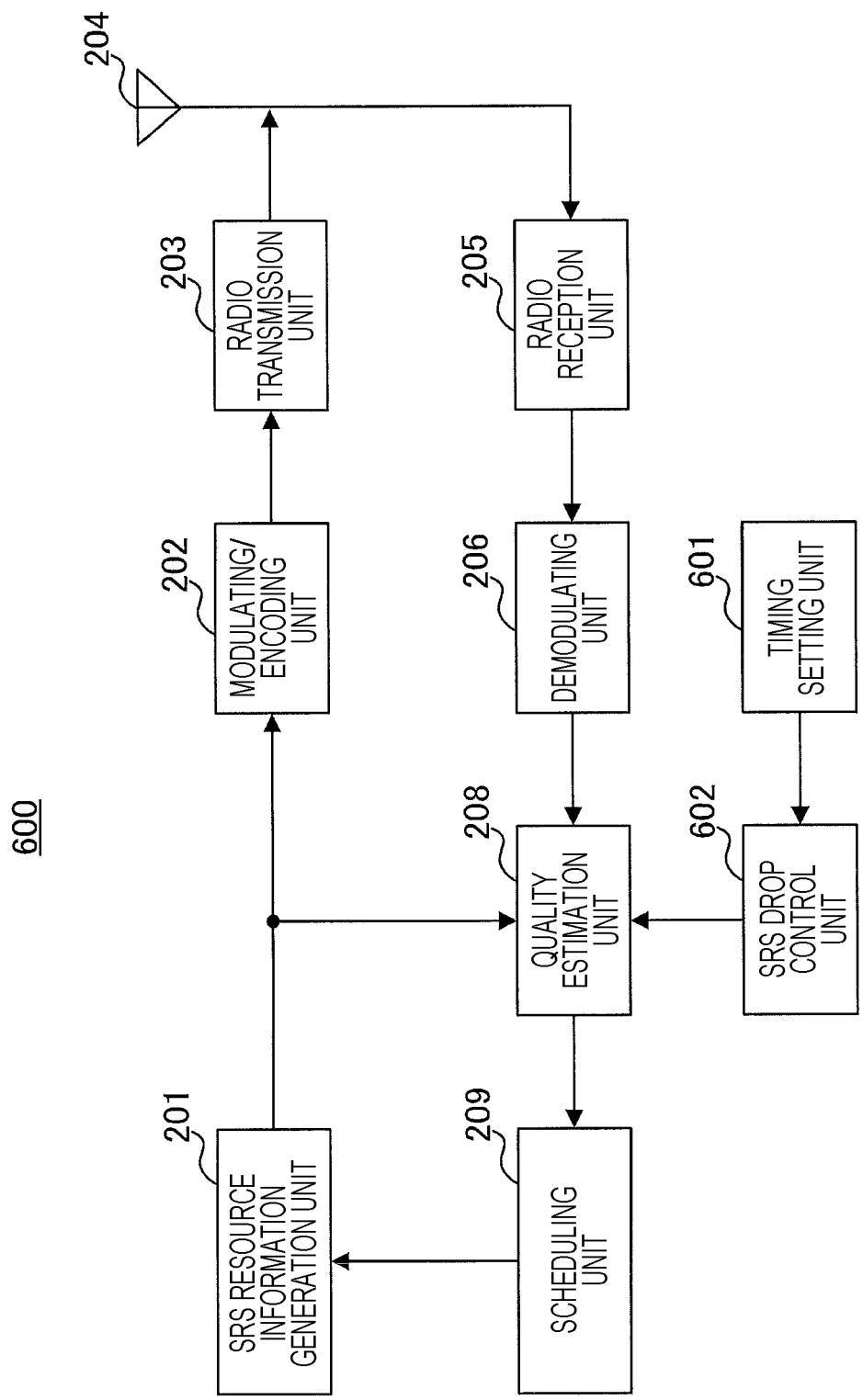
FIG. 18 depicts the configuration of a base station according to embodiment 3.

FIG. 18 is a block diagram depicting the configuration of a base station 600 according to the present embodiment. It should be noted that, in FIG. 18, the same configurations as in embodiment 1 (FIG. 6) are denoted by the same reference signs, and descriptions thereof have been omitted. Specifically, compared to the base station 200 depicted in FIG. 6, a timing setting unit 601 has been added to the base station 600 depicted in FIG. 18.

Similar to the timing setting unit 501 provided in the terminal 500, the timing setting unit 601 sets transmission timing information (for example, a slot number (or a subframe number), an SRS transmission count number, or the like) for SRSs transmitted by each terminal 500, and outputs the transmission timing information to an SRS drop control unit 602.

The SRS drop control unit 602 decides partial bands (partial band numbers) having a possibility of being dropped, on the basis of the transmission timing information that is input from the timing setting unit 601, and outputs decided partial band numbers to the quality estimation unit 208.

Method for Deciding Partial Bands to be Dropped

Next, a detailed description will be given regarding a method (drop rule) for deciding partial bands to be dropped in a case where the terminal 500 is a power-limited terminal, in the terminal 500 (SRS drop control unit 502).

Specific Example 4

In specific example 4, the SRS drop control unit 502 decides the partial bands to be dropped, on the basis of an SRS transmission count, as an example of transmission timing information.

Figure 19:
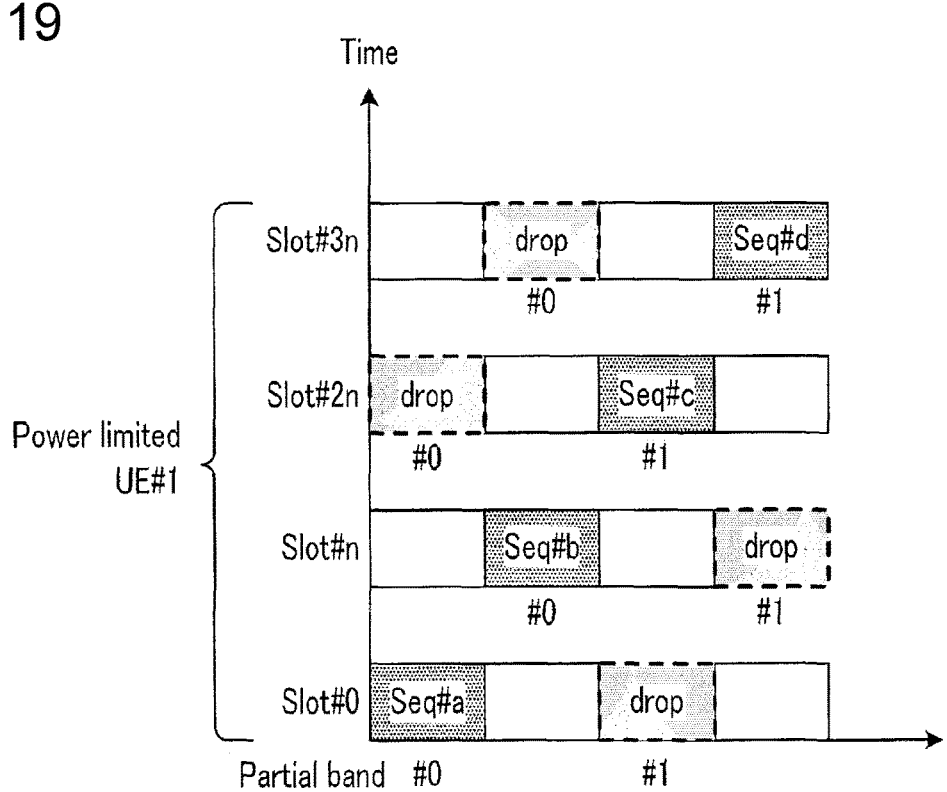
FIG. 19 depicts an example of a method for deciding partial bands to be dropped according to embodiment 3.
Figure 20:
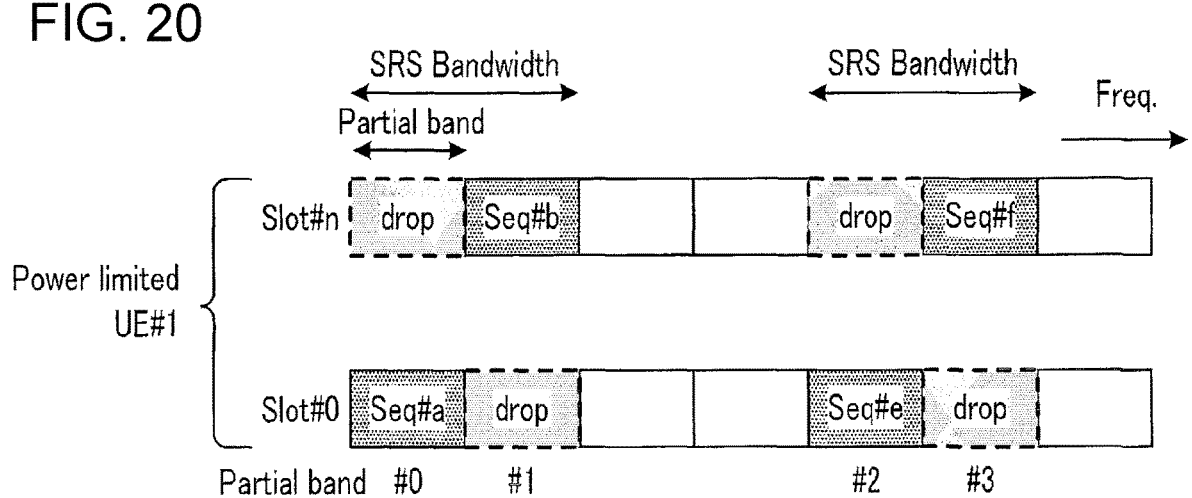
FIG. 20 depicts an example of a method for deciding partial bands to be dropped according to embodiment 3.

FIGS. 19 and 20 depict examples of the partial bands that are dropped in specific example 4. FIG. 19 depicts a case where the SRS transmission band temporally fluctuates (frequency hopping is employed), and FIG. 20 depicts a case where the SRS transmission band is temporally fixed (frequency hopping is not employed). It should be noted that, in FIGS. 19 and 20, a logical partial band number is added in the SRS transmission band of each slot.

In FIG. 19, the terminal 500 transmits multi-PB SRSs every n slots, and transmits SRSs across the entire sounding band (the entire transmission band for SRSs within the system band) over a plurality of slots. In FIG. 19, when SRSs are transmitted in the sounding band, it is necessary for the terminal 500 to carry out SRS transmission two times.

In this case, the SRS drop control unit 502 switches the partial bands (partial band numbers) that are dropped, each time SRSs are transmitted the number of times required to transmit SRSs across the entire sounding band. For example, in FIG. 19, the SRS drop control unit 502 drops the odd-numbered partial band #1 in the first two SRS transmissions (slots #0 and #n), and drops the even-numbered partial band #0 in the next two SRS transmissions (slots #2n and #3n). The same is also true for the subsequent two SRS transmissions and thereafter.

Next, in FIG. 20, the terminal 500 transmits SRSs every n slots.

In this case, as depicted in FIG. 20, the SRS drop control unit 502 drops the odd-numbered partial bands #1 and #3 in the first SRS transmission (slot #0), and drops the even-numbered partial bands #0 and #2 in the next SRS transmission (slot #n). The same is also true for the subsequent SRS transmission and thereafter.

Based on the above, in the present embodiment, similar to embodiment 1, due to a portion of partial bands within the SRS transmission band being dropped, the maximum transmission power ($P_{CMAX,c}$) at which transmission is possible for the terminal 500 increases, the transmission power ($P_{req,c}$) required for the transmission of SRSs decreases, and with respect to SRSs transmitted by means of the remaining partial bands, the possibility of being able to transmit transmission signals by means of the transmission power as requested by the base station 600 increases. Thus, a power-limited terminal is able to transmit SRSs by means of the transmission power as requested by the base station 600, or a power that is close to the transmission power requested by the base station 600, using the remaining partial bands that have not been dropped. Thus, using multi-PB SRSs transmitted from a power-limited terminal by means of the remaining partial bands other than the portion of partial bands that have been dropped, the base station 600 is able to precisely estimate the uplink quality of the remaining partial bands.

Furthermore, according to the present embodiment, the drop rule for multi-PB SRSs is decided based on SRS transmission timing information (time information) according to the terminal 500. In other words, the portion of partial bands that are dropped in the terminal 500 are associated with a timing (transmission timing information) at which the terminal 500 transmits an SRS.

Thus, the terminal 500 is able to transmit SRSs across the entire SRS transmission band over a plurality of slots while dropping a portion of partial bands within the SRS transmission band depicted in FIG. 19 or 20, and it is therefore possible to improve the frequency scheduling performance of the base station 600. Furthermore, the partial bands that are dropped by a power-limited terminal can be made random (made uniform) in the plurality of slots in which SRSs are transmitted.

Embodiment 4

In the present embodiment, a description will be given regarding a case where the drop rule for multi-PB SRSs is decided using SRS parameter information.

Configuration of Terminal

Figure 21:
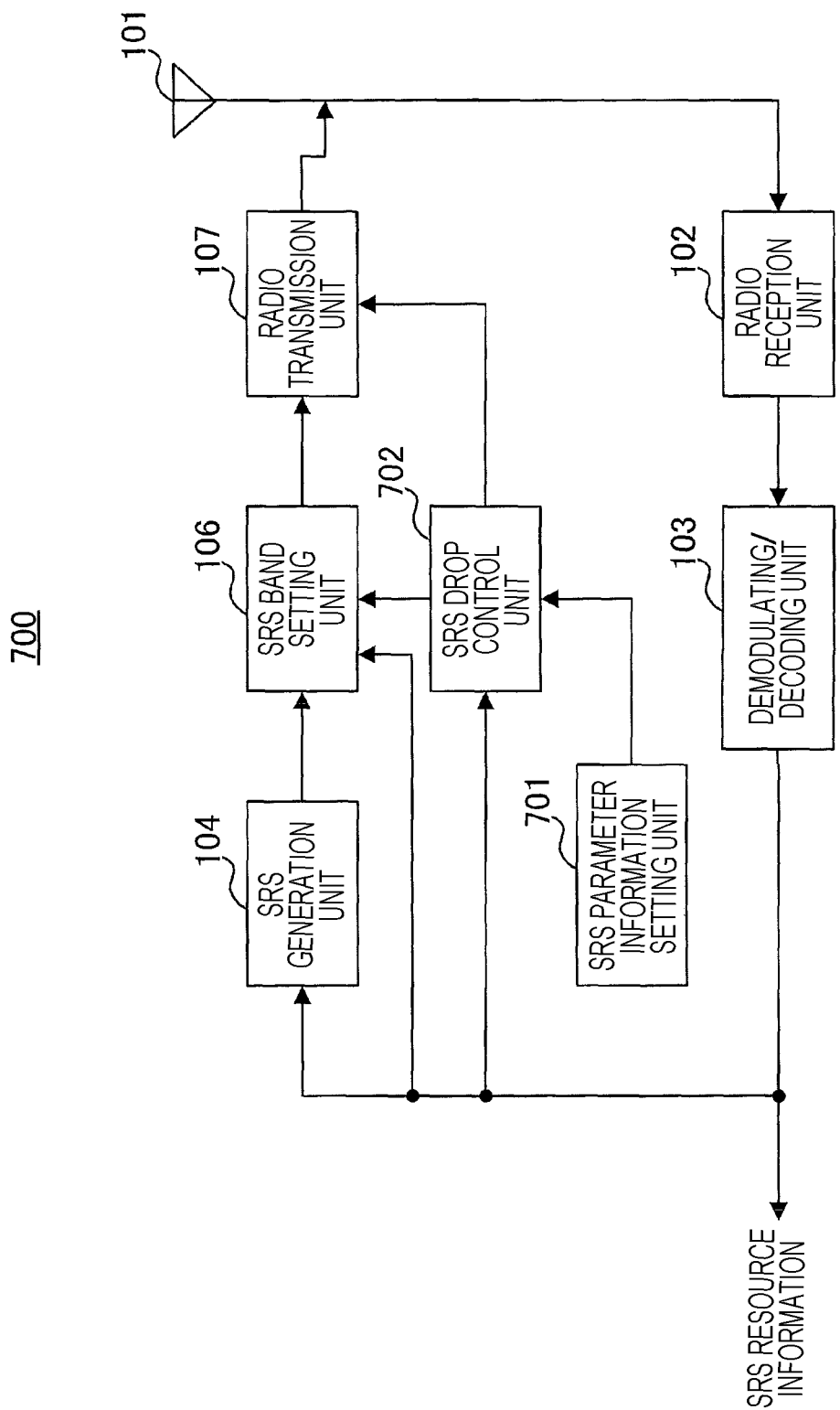
FIG. 21 depicts the configuration of a terminal according to embodiment 4.

FIG. 21 is a block diagram depicting the configuration of a terminal 700 according to the present embodiment. It should be noted that, in FIG. 21, the same configurations as in embodiment 1 (FIG. 5) are denoted by the same reference signs, and descriptions thereof have been omitted. Specifically, compared to the terminal 100 depicted in FIG. 5, an SRS parameter information setting unit 701 has been added to the terminal 700 depicted in FIG. 21.

The SRS parameter information setting unit 701 sets a plurality of items of SRS parameter information, and outputs the SRS parameter information to an SRS drop control unit 702.

Here, the SRS parameter information is setting information that includes an SRS hopping pattern (frequency resource information of each transmission time resource). The SRS parameter information is SRS configuration information that is notified from a base station 800 described later, as information that is either DCI, MAC, or RRC, or a combination thereof, for example. Furthermore, the SRS parameter information is set for each band making up the SRS transmission band, configured of contiguous partial bands. In other words, in a case where one terminal 700 transmits multi-PB SRSs by means of non-contiguous bands, the base station 800 notifies the one terminal 700 of a plurality of items of SRS parameter information respectively corresponding to the plurality of non-contiguous bands.

The SRS drop control unit 702 decides the partial bands to be dropped, on the basis of the SRS parameter information that is input from the SRS parameter information setting unit 701, and outputs information indicating the decided partial bands (for example, partial band numbers) to the SRS band setting unit 106.

Configuration of Base Station

Figure 22:
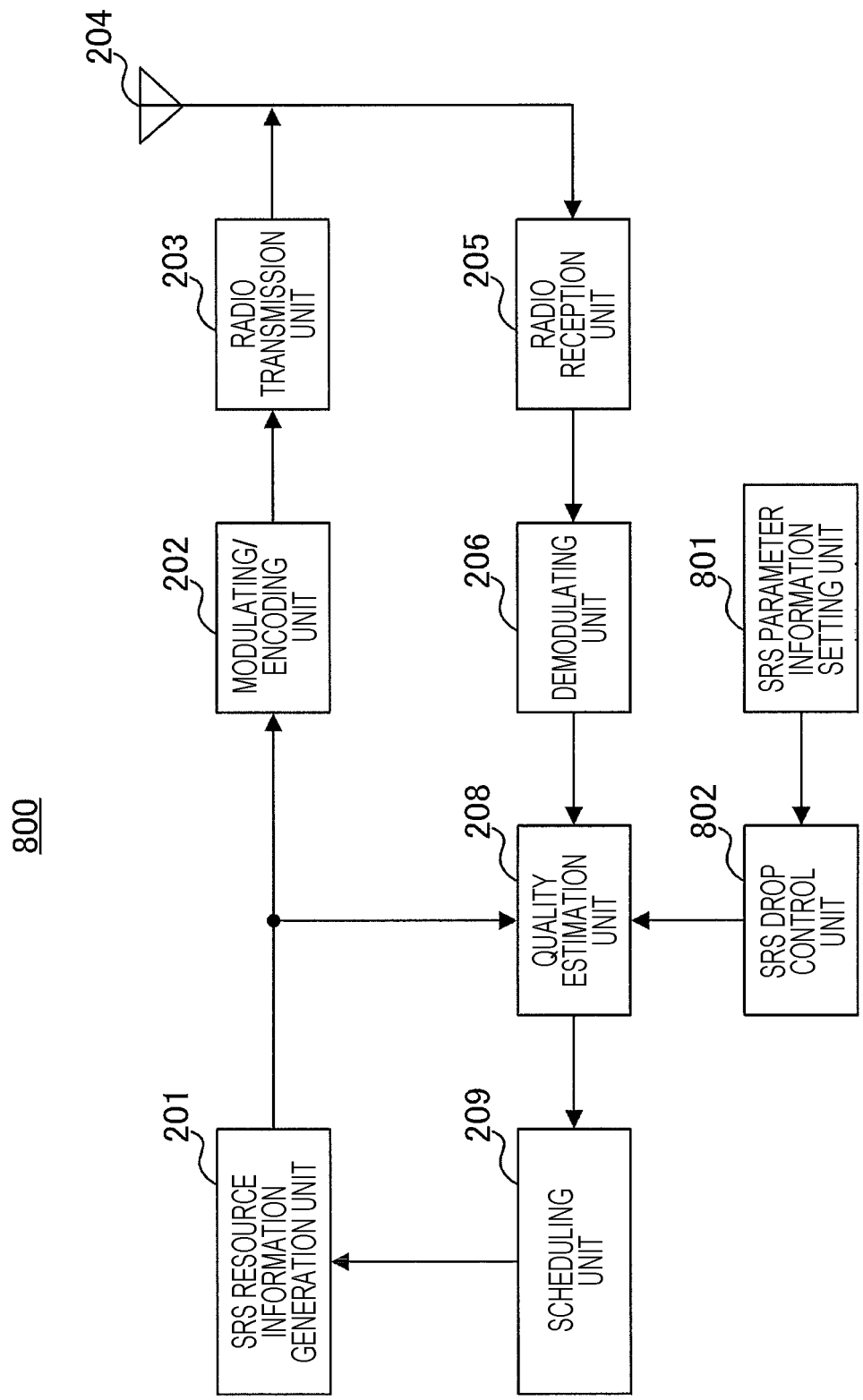
FIG. 22 depicts the configuration of a base station according to embodiment 4.

FIG. 22 is a block diagram depicting the configuration of the base station 800 according to the present embodiment. It should be noted that, in FIG. 22, the same configurations as in embodiment 1 (FIG. 6) are denoted by the same reference signs, and descriptions thereof have been omitted. Specifically, compared to the base station 200 depicted in FIG. 6, an SRS parameter information setting unit 801 has been added to the base station 800 depicted in FIG. 22.

Similar to the SRS parameter information setting unit 701 provided in the terminal 700, the SRS parameter information setting unit 801 outputs SRS parameter information (for example, SRS configuration information) of each terminal 700 to an SRS drop control unit 802.

The SRS drop control unit 802 decides partial bands (partial band numbers) having a possibility of being dropped, on the basis of the SRS parameter information that is input from the SRS parameter information setting unit 801, and outputs decided partial band numbers to the quality estimation unit 208.

Method for Deciding Partial Bands to be Dropped

Next, a detailed description will be given regarding a method (drop rule) for deciding partial bands to be dropped in a case where the terminal 700 is a power-limited terminal, in the terminal 700 (SRS drop control unit 702).

Specific Example 5

In specific example 5, the SRS drop control unit 702 decides the partial bands to be dropped, on the basis of SRS parameter information.

A plurality of items of SRS parameter information are set in the terminal 700, the plurality of items of SRS parameter information indicating a frequency hopping pattern (that is, partial bands to which SRSs are allocated) for each contiguous band making up the SRS transmission band. For example, in FIG. 23, two items of SRS parameter information (SRS config #1 and SRS config #2) are set with respect to the terminal 700 for which an SRS transmission band configured of two contiguous bands has been set. The terminal 700 transmits SRSs in non-contiguous bands (two contiguous bands) in each slot, using SRS config #1 and SRS config #2. Furthermore, the terminal 700 transmits SRSs in bands for which frequency hopping is carried out every n slots, using SRS config #1 and SRS config #2.

In a case where a plurality of frequency hopping patterns are set for one terminal 700 in this way, the terminal 700, when having determined that the device itself is a power-limited terminal, drops the partial bands corresponding to a frequency hopping pattern indicated in some of the SRS parameter information.

Figure 24:
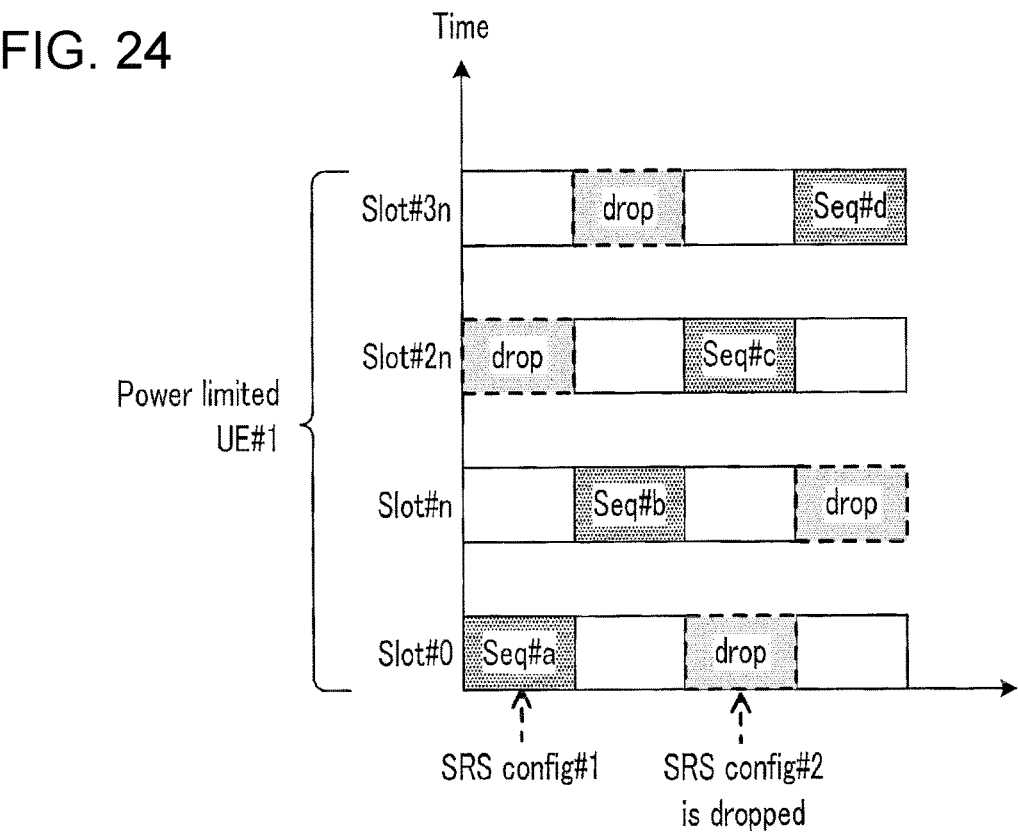
FIG. 24 depicts an example of a method for deciding partial bands to be dropped according to embodiment 4.

FIG. 24 depicts an example of the partial bands that are dropped in specific example 5.

Figure 23:
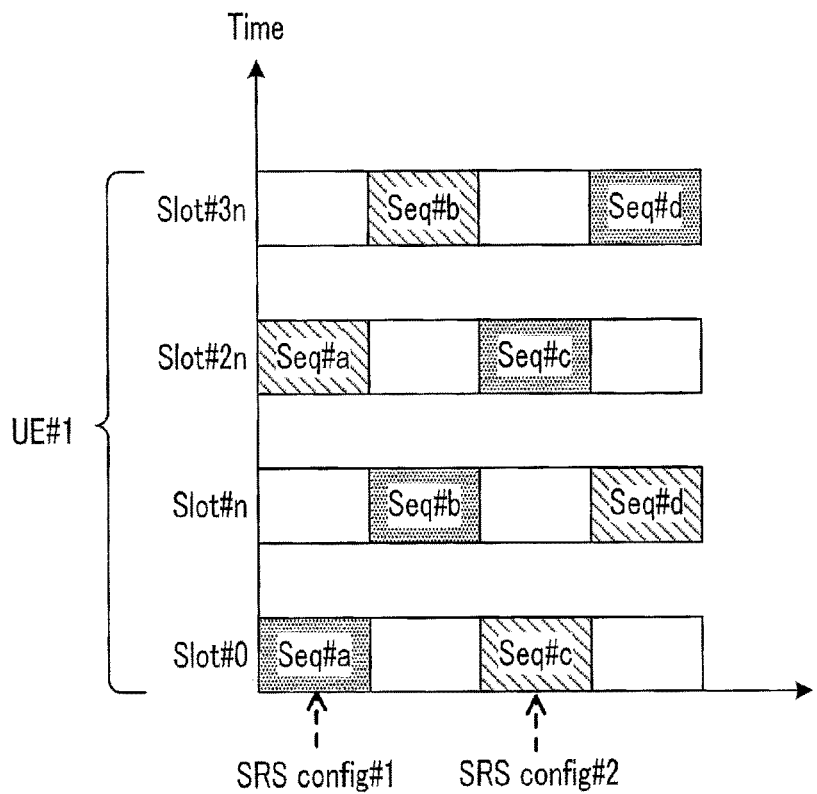
FIG. 23 depicts an example of SRS configuration information according to embodiment 4.

In FIG. 24, the SRS drop control unit 702 drops the partial bands corresponding to the frequency hopping pattern according to SRS config #2 from among SRS config #1 and SRS config #2 set in the terminal 700 (see FIG. 23).

It should be noted that, in a case where unique numbers (SRS configuration information numbers) are added to the plurality of items of SRS parameter information (SRS configuration information), the SRS drop control unit 702 may drop SRS resources notified by means of some of the SRS configuration information numbers.

Furthermore, in a case where a plurality of items of SRS configuration information are notified by means of different notification methods, the SRS drop control unit 702 may decide SRS configuration information (frequency hopping information) to be dropped, in accordance with the notification method of the SRS configuration information. For example, in a case where a plurality of items of SRS configuration information are notified to the terminal 700 by means of a notification of an RRC base used to notify temporally semi-static information and a notification of a DCI base used to notify dynamic information, the SRS drop control unit 702 may preferentially drop an SRS resource corresponding to the SRS information notified by means of the RRC base. That is, the terminal 700 preferentially transmits SRSs corresponding to SRS configuration information notified by means of a DCI base.

Based on the above, in the present embodiment, similar to embodiment 1, due to a portion of partial bands within the SRS transmission band being dropped, the maximum transmission power ($P_{CMAX,c}$) at which transmission is possible for the terminal 700 increases, the transmission power ($P_{req,c}$) required for the transmission of SRSs decreases, and with respect to SRSs transmitted by means of the remaining partial bands, the possibility of being able to transmit transmission signals by means of the transmission power as requested by the base station 800 increases. Thus, a power-limited terminal is able to transmit SRSs by means of the transmission power as requested by the base station 800, or a power that is close to the transmission power requested by the base station 800, using the remaining partial bands that have not been dropped. Thus, using multi-PB SRSs transmitted from a power-limited terminal by means of the remaining partial bands other than the portion of partial bands that have been dropped, the base station 800 is able to precisely estimate the uplink quality of the remaining partial bands.

Furthermore, according to the present embodiment, the drop rule for multi-PB SRSs is decided based on SRS parameter information including a plurality of frequency hopping patterns.

In other words, the portion of partial bands that are dropped in the terminal 700 are partial bands that are indicated in some SRS parameter information from among the plurality of items of SRS parameter information that are set in the terminal 700.

Thus, the terminal 700 (power-limited terminal) drops an SRS resource corresponding to a frequency hopping pattern according to some SRS parameter information. Thus, the power-limited terminal is able to transmit SRSs across the entire sounding band over a plurality of slots while dropping a portion of SRS resources (partial bands), and it is therefore possible to improve the frequency scheduling performance of the base station 800.

Embodiment 5

In the present embodiment, a description will be given regarding a case where the drop rule for multi-PB SRSs is decided using sequence information (sequence numbers and CS numbers) of SRSs.

Configuration of Terminal

Figure 25:
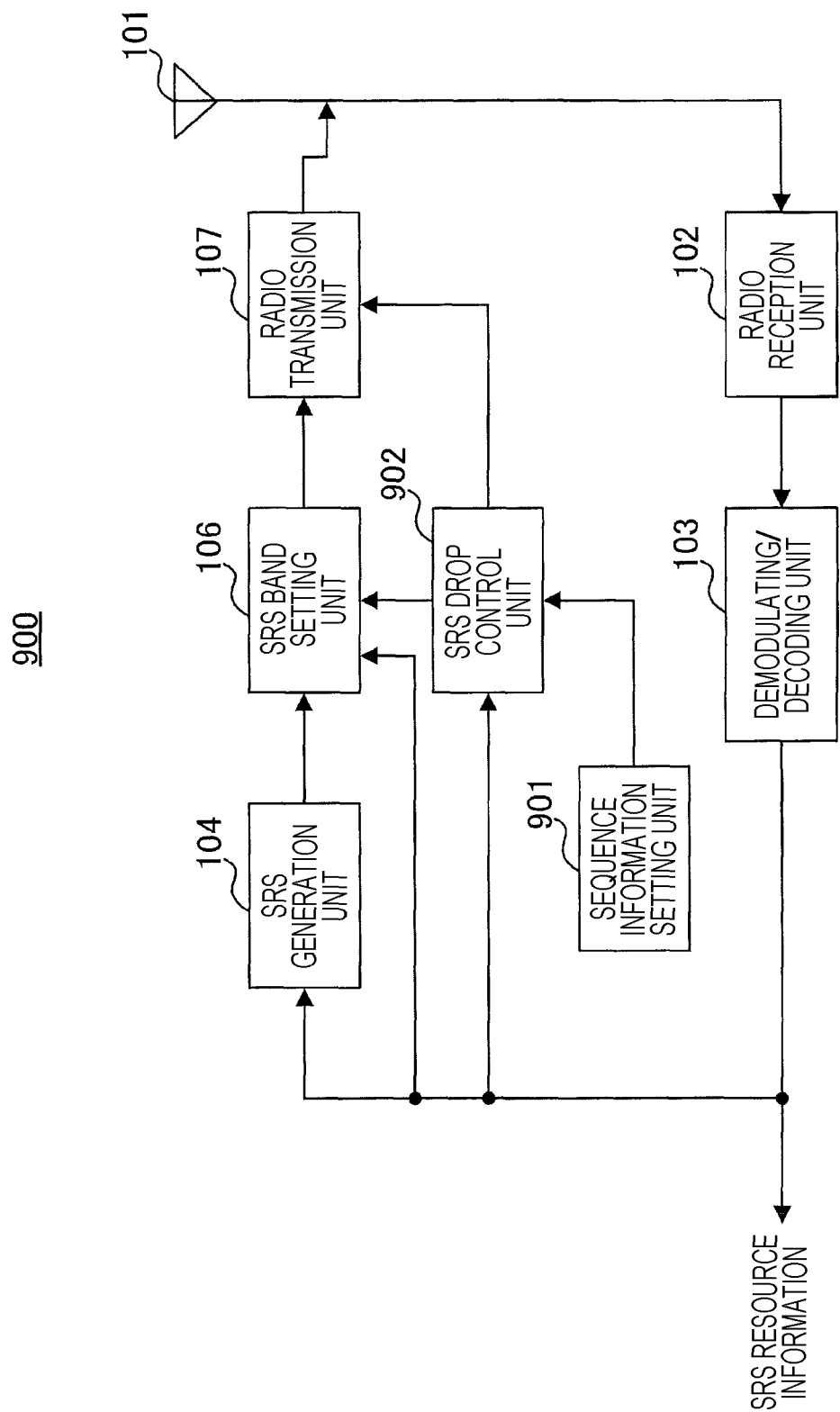
FIG. 25 depicts the configuration of a terminal according to embodiment 5.

FIG. 25 is a block diagram depicting the configuration of a terminal 900 according to the present embodiment. It should be noted that, in FIG. 25, the same configurations as in embodiment 1 (FIG. 5) are denoted by the same reference signs, and descriptions thereof have been omitted. Specifically, compared to the terminal 100 depicted in FIG. 5, a sequence information setting unit 901 has been added to the terminal 900 depicted in FIG. 25.

The sequence information setting unit 901 sets sequence information that includes a sequence number and a CS number of a code sequence with which SRSs are generated, and outputs the sequence information to the SRS drop control unit 902.

An SRS drop control unit 902 decides the partial bands to be dropped, on the basis of sequence information that is input from the sequence information setting unit 901, and outputs information indicating the decided partial bands (for example, partial band numbers) to the SRS band setting unit 106.

Configuration of Base Station

Figure 26:
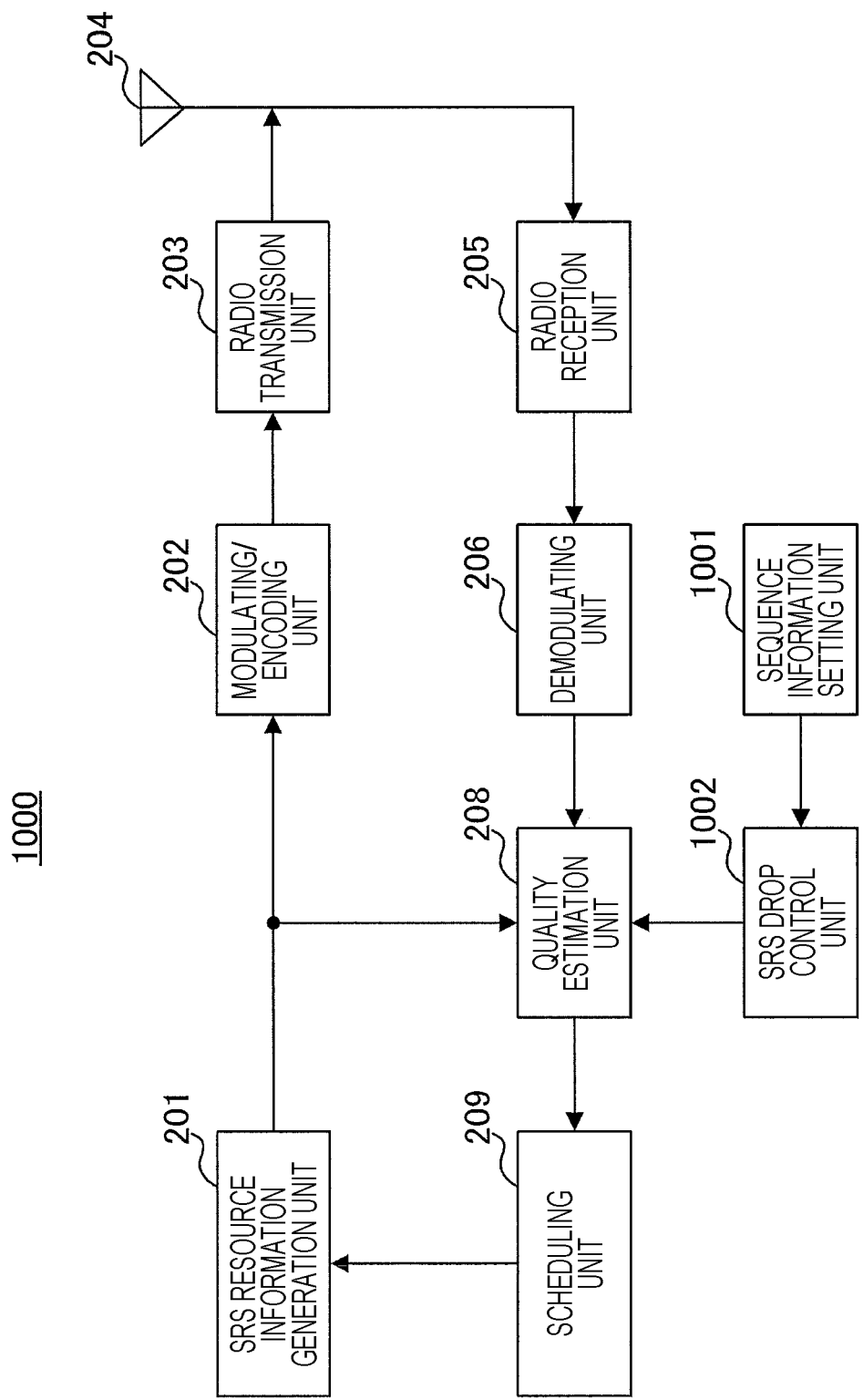
FIG. 26 depicts the configuration of a base station according to embodiment 5.

FIG. 26 is a block diagram depicting the configuration of a base station 1000 according to the present embodiment. It should be noted that, in FIG. 26, the same configurations as in embodiment 1 (FIG. 6) are denoted by the same reference signs, and descriptions thereof have been omitted. Specifically, compared to the base station 200 depicted in FIG. 6, a sequence information setting unit 1001 has been added to the base station 1000 depicted in FIG. 26.

Similar to the sequence information setting unit 901 provided in the terminal 900, the sequence information setting unit 1001 outputs sequence information (for example, sequence numbers and CS numbers) of SRSs of each terminal 900 to an SRS drop control unit 1002.

The SRS drop control unit 1002 decides partial bands (partial band numbers) having a possibility of being dropped, on the basis of the sequence information that is input from the sequence information setting unit 1001, and outputs decided partial band numbers to the quality estimation unit 208.

Method for Deciding Partial Bands to be Dropped

Next, a detailed description will be given regarding a method (drop rule) for deciding partial bands to be dropped in a case where the terminal 700 is a power-limited terminal, in the terminal 700 (SRS drop control unit 702).

Specific Example 6

In specific example 6, the SRS drop control unit 902 decides the partial bands to be dropped, on the basis of the sequence information.

Figure 27:
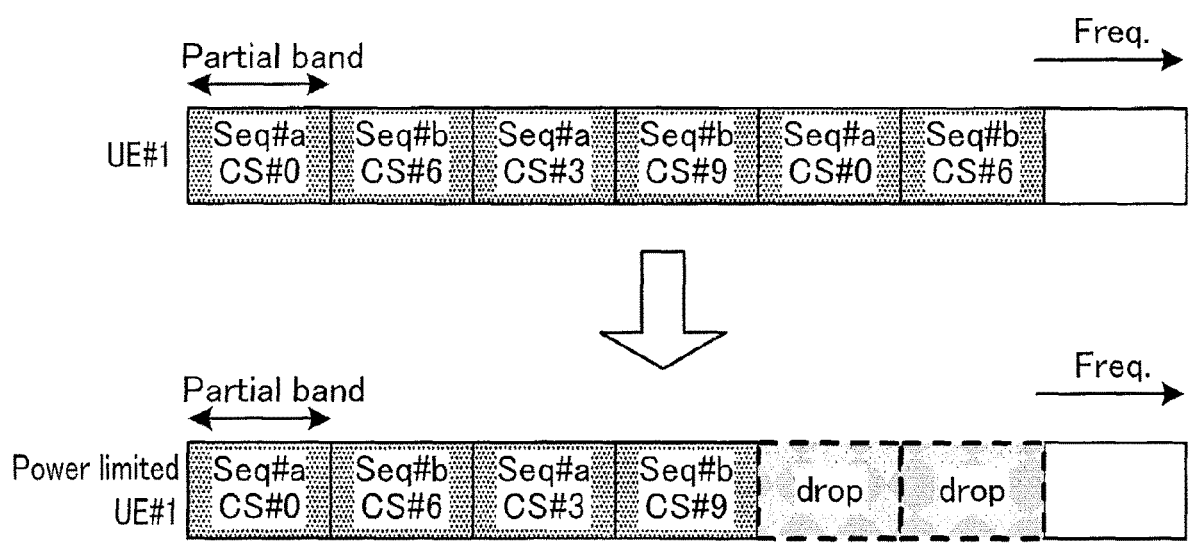
FIG. 27 depicts an example of a method for deciding partial bands to be dropped according to embodiment 5.

FIG. 27 depicts an example of the partial bands that are dropped in specific example 6. In FIG. 27, with respect to UE #1 (terminal 900), sequence numbers (Seq #a and #b) and CS numbers (CS #0, #3, #6, and #9) of code sequences used for the generation of SRSs are set for every partial band.

In a case where the terminal 900 is a power-limited terminal, the SRS drop control unit 902 drops at least one partial band from among a plurality of partial bands having set therefor code sequences in which both sequence numbers and CS numbers are the same.

For example, in FIG. 27, there are two partial bands having the same sequence number Seq #a and CS number CS #0, and there are two partial bands having the same sequence number Seq #b and CS number CS #6. Thus, the SRS drop control unit 902 drops one partial band for which Seq #a and CS #0 have been set and one partial band for which Seq #b and CS #6 have been set.

In FIG. 27, a description has been given regarding the case where partial bands in which both the sequence numbers and the CS numbers are the same are dropped; however, it should be noted that there is no restriction thereto, and partial bands in which at least the sequence numbers are the same may be dropped regardless of the CS numbers, for example.

Based on the above, in the present embodiment, similar to embodiment 1, due to a portion of partial bands within the SRS transmission band being dropped, the maximum transmission power ($P_{CMAX,c}$) at which transmission is possible for the terminal 900 increases, the transmission power ($P_{req,c}$) required for the transmission of SRSs decreases, and with respect to SRSs transmitted by means of the remaining partial bands, the possibility of being able to transmit transmission signals by means of the transmission power as requested by the base station 1000 increases. Thus, a power-limited terminal is able to transmit SRSs by means of the transmission power as requested by the base station 1000, or a power that is close to the transmission power requested by the base station 1000, using the remaining partial bands that have not been dropped. Thus, using multi-PB SRSs transmitted from a power-limited terminal by means of the remaining partial bands other than the portion of partial bands that have been dropped, the base station 1000 is able to precisely estimate the uplink quality of the remaining partial bands.

Furthermore, according to the present embodiment, the drop rule for multi-PB SRSs is decided based on sequence information (sequence numbers and CS numbers) of code sequences used for the generation of SRSs. Here, there is a characteristic in that the CM/PAPR characteristics increase in a case where code sequences are used having sequence numbers that are the same or sequence numbers and CS numbers that are both the same. Thus, by dropping partial bands having set therefor code sequences in which the sequence numbers are the same or both the sequence numbers and the CS numbers are the same as in the present embodiment, the CM/PAPR characteristics can be reduced (that is, the MPRc can be reduced), and the maximum transmission power at which transmission is possible ($P_{CMAX,c}$ of expression (3)) can be increased.

Embodiments of the present disclosure have been described hereinabove.

It should be noted that the aforementioned embodiments may be combined. For example, in a case where, first, the drop rule based on sequence information described in embodiment 5 is applied and it is determined that a terminal is still a power-limited terminal after partial bands have been dropped, the drop rule based on terminal-specific parameter information described in embodiment 2 may also be applied. Alternatively, the base station may notify each terminal of the drop rule to be applied. Alternatively, the drop rule that is applied for each cell may be set.

Furthermore, in the aforementioned embodiments, a portion of partial bands being dropped means that SRSs are transmitted by means of a portion of partial bands (the remaining partial bands).

Furthermore, in the aforementioned embodiments, descriptions have been given with SRSs as an example; however, there is no restriction thereto, and the present disclosure can also be applied to reference signals that use a code sequence such as DM-RS (demodulation reference signal) or CSI-RS (channel state information reference signal).

It is possible for the present disclosure to be realized by means of software, hardware, or software in cooperation with hardware. Each functional block used in the description of the aforementioned embodiments may be partially or entirely realized as an LSI, which is an integrated circuit, and each process described in the aforementioned embodiments may be partially or entirely controlled by one LSI or a combination of LSIs. The LSIs may be configured from individual chips, or may be configured from one chip so as to include some or all of the functional blocks. The LSIs may be provided with data input and output. The LSIs are also referred to as ICs, system LSIs, super LSIs, or ultra LSIs depending on differences in the degree of integration. The circuit integration technique is not limited to an LSI, and may be realized using a dedicated circuit, a general-purpose processor, or a dedicated processor. Furthermore, after an LSI has been manufactured, an FPGA (field-programmable gate array) that can be programmed, or a reconfigurable processor with which the connections and settings of circuit cells within the LSI can be reconfigured, may be used. The present disclosure may be realized as digital processing or analog processing. In addition, if circuit integration technology that replaces LSI appears as a result of another technology that is an advancement in semiconductor technology or is derived therefrom, naturally, the other technology may be used to carry out the integration of functional blocks. Biotechnology applications and the like are also a possibility.

A terminal of the present disclosure is provided with: a circuit that drops a portion of partial bands from among a plurality of partial bands in a case where transmission power for reference signals generated using a plurality of sequences having a sequence length that corresponds to a partial band exceeds a threshold value; and a transmitter that transmits the reference signals by means of remaining partial bands other than the portion of partial bands that are dropped from among the plurality of partial bands.

In the terminal of the present disclosure, the circuit drops non-contiguous partial bands from among the plurality of partial bands.

In the terminal of the present disclosure, the circuit drops contiguous partial bands from among the plurality of partial bands.

In the terminal of the present disclosure, the portion of partial bands that are dropped are associated with terminal-specific information.

In the terminal of the present disclosure, the portion of partial bands that are dropped are associated with timings at which the terminal transmits the reference signals.

In the terminal of the present disclosure, the transmitter transmits the reference signals in accordance with a plurality of items of setting information indicating partial bands to which the reference signals are allocated, and the portion of partial bands that are dropped are partial bands indicated in some setting information from among the plurality of items of setting information.

In the terminal of the present disclosure, the portion of partial bands that are dropped are at least one partial band out of partial bands for which there have been set code sequences having sequence numbers that are the same, from among the plurality of partial bands.

In the terminal of the present disclosure, the portion of partial bands that are dropped are at least one partial band out of partial bands having set therefor code sequences in which both sequence numbers and cyclic shift numbers are the same, from among the plurality of partial bands.

A communication method of the present disclosure includes: dropping a portion of partial bands from among a plurality of partial bands in a case where transmission power for reference signals generated using a plurality of sequences having a sequence length that corresponds to a partial band exceeds a threshold value; and transmitting the reference signals by means of remaining partial bands other than the portion of partial bands that are dropped from among the plurality of partial bands.

An embodiment of the present disclosure is useful in a mobile communication system.

REFERENCE SIGNS LIST

100, 300, 500, 700, 900 Terminal
101, 204 Antenna 102, 205 Radio reception unit
103 Demodulating/decoding unit
104 SRS generation unit
105, 207, 302, 402, 502, 602, 702, 802, 902, 1002 SRS drop control unit
106 SRS band setting unit
107, 203 Radio transmission unit
200, 400, 600, 800, 1000 Base station
201 SRS resource information generation unit
202 Modulating/encoding unit
206 Demodulating unit
208 Quality estimation unit
209 Scheduling unit
301, 401 Terminal information setting unit
501, 601 Timing setting unit
701, 801 SRS parameter information setting unit
901, 1001 Sequence information setting unit

The invention claimed is:

1. A terminal comprising:
circuitry, which, in operation, drops a portion of partial frequency bands from among a plurality of partial frequency bands of a reference signal transmission bandwidth in a case where transmission power for reference signals generated using a plurality of sequences having a sequence length that corresponds to a partial frequency band exceeds a threshold value; and
a transmitter, which, in operation, transmits the reference signals using remaining partial frequency bands of the reference signal transmission bandwidth other than the portion of partial frequency bands that is dropped from among the plurality of partial frequency bands.

2. The terminal according to claim 1,
wherein the circuitry, in operation, drops non-contiguous partial frequency bands from among the plurality of partial frequency bands.

3. The terminal according to claim 1,
wherein the circuitry, in operation, drops contiguous partial frequency bands from among the plurality of partial frequency bands.

4. The terminal according to claim 1,
wherein the portion of partial frequency bands that is dropped is associated with terminal-specific information.

5. The terminal according to claim 1,
wherein the portion of partial frequency bands that is dropped is associated with timings at which the terminal transmits the reference signals.

6. The terminal according to claim 1,
wherein the transmitter, in operation, transmits the reference signals in accordance with a plurality of items of setting information indicating partial frequency bands to which the reference signals are allocated, and
wherein the portion of partial frequency bands that is dropped is indicated in one or more of the plurality of items of setting information.

7. The terminal according to claim 1,
wherein the portion of partial frequency bands that is dropped includes at least one partial frequency band out of partial frequency bands for which there have been set code sequences having sequence numbers that are the same, from among the plurality of partial frequency bands.

8. The terminal according to claim 1,
wherein the portion of partial frequency bands that is dropped includes at least one partial frequency band out of partial frequency bands having set therefor code sequences in which both sequence numbers and cyclic shift numbers are the same, from among the plurality of partial frequency bands.

9. A communication method comprising:
dropping a portion of partial frequency bands from among a plurality of partial frequency bands of a reference signal transmission bandwidth in a case where transmission power for reference signals generated using a plurality of sequences having a sequence length that corresponds to a partial frequency band exceeds a threshold value; and
transmitting the reference signals using remaining partial frequency bands of the reference signal transmission bandwidth other than the portion of partial frequency bands that is dropped from among the plurality of partial frequency bands.

10. The communication method according to claim 9,
wherein the dropping includes dropping non-contiguous partial frequency bands from among the plurality of partial frequency bands.

11. The communication method according to claim 9,
wherein the dropping includes dropping contiguous partial frequency bands from among the plurality of partial frequency bands.

12. The communication method according to claim 9,
wherein the portion of partial frequency bands that is dropped is associated with communication method-specific information.

13. The communication method according to claim 9,
wherein the portion of partial frequency bands that is dropped is associated with timings at which the terminal transmits the reference signals.

14. The communication method according to claim 9,
wherein the transmitting includes transmitting the reference signals in accordance with a plurality of items of setting information indicating partial frequency bands to which the reference signals are allocated, and
wherein the portion of partial frequency bands that is dropped is indicated in one or more of the plurality of items of setting information.

15. The communication method according to claim 9,
wherein the portion of partial frequency bands that is dropped includes at least one partial frequency band out of partial frequency bands for which there have been set code sequences having sequence numbers that are the same, from among the plurality of partial frequency bands.

16. The communication method according to claim 9,
wherein the portion of partial frequency bands that is dropped includes at least one partial frequency band out of partial frequency bands having set therefor code sequences in which both sequence numbers and cyclic shift numbers are the same, from among the plurality of partial frequency bands.

* * * * *